United States Patent
Najaf-Zadeh et al.

(10) Patent No.: US 11,210,812 B2
(45) Date of Patent: Dec. 28, 2021

(54) SINGLE-PASS BOUNDARY DETECTION IN VIDEO-BASED POINT CLOUD COMPRESSION

(71) Applicant: Samsung Electronics Co., Ltd, Suwon-si (KR)

(72) Inventors: Hossein Najaf-Zadeh, Allen, TX (US); Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/929,663

(22) Filed: May 14, 2020

(65) Prior Publication Data

US 2020/0364904 A1 Nov. 19, 2020

Related U.S. Application Data

(60) Provisional application No. 62/848,188, filed on May 15, 2019, provisional application No. 62/904,244, (Continued)

(51) Int. Cl.
*G06T 9/00* (2006.01)
*G06T 19/20* (2011.01)

(52) U.S. Cl.
CPC ............... *G06T 9/00* (2013.01); *G06T 19/20* (2013.01); *G06T 2210/56* (2013.01); *G06T 2219/2021* (2013.01)

(58) Field of Classification Search
None
See application file for complete search history.

(56) References Cited

U.S. PATENT DOCUMENTS

2018/0276884 A1 9/2018 Feng et al.
2019/0087979 A1 3/2019 Mammou et al.
(Continued)

FOREIGN PATENT DOCUMENTS

EP 3429206 A1 1/2019
WO 2018179532 A1 10/2018

OTHER PUBLICATIONS

Hossein Najaf-Zadeh et al.; International Organisation for Standardisation Organisation Internationale De Normalisation, Iso/Iec Jtc1/Sc29/Wg11 Coding of Moving Pictures and Audio; PCC] TMC2 CE2.12 color smoothing of reconstructed point cloud; ISO/IEC JTC1/SC29/WG11, m43717; Jul. 2018, Ljubljana, Slovenia—11 Pages.

(Continued)

*Primary Examiner* — Vu Nguyen

(57) ABSTRACT

A decoding device includes a communication interface and a processor. The communication interface is configured to receive a bitstream. The processor is configured to decode from the bitstream a first frame, a second frame and an occupancy map frame. The processor is also configured to reconstruct the 3D point cloud using the first frame, the second frame, and the occupancy map frame. The processor is further configured to perform a single pass of the occupancy map frame to identify points of the reconstructed 3D point cloud that correspond to a subset of pixels in the first frame and the second frame that are positioned within a proximity threshold to a boundary of any of the patches.

20 Claims, 20 Drawing Sheets

Related U.S. Application Data filed on Sep. 23, 2019, provisional application No. 62/986,366, filed on Mar. 6, 2020.

(56) References Cited

U.S. PATENT DOCUMENTS

| | | |
|---|---|---|
| 2019/0108655 A1 | 4/2019 | Lasserre et al. |
| 2019/0139266 A1 | 5/2019 | Budagavi et al. |
| 2019/0156520 A1* | 5/2019 | Mammou ............... G06T 9/001 |

OTHER PUBLICATIONS

Hossein Najaf-Zadeh et al.; International Organisation for Standardisation Organisation Internationale De Normalisation ISO/IEC JTC1/SC29/WG11 Coding of Moving Pictures and Audio; [V-PCC][New Proposal] Single-pass Boundary Points Identification; ISO/IEC JTC1/SC29/WG11 m49592; Jul. 2019, Gothenburg, Sweden—3 Pages.
International Search Report of the International Searching Authority in connection with International Application No. PCT/KR2020/006443 dated Aug. 26, 2020, 3 pages.

\* cited by examiner

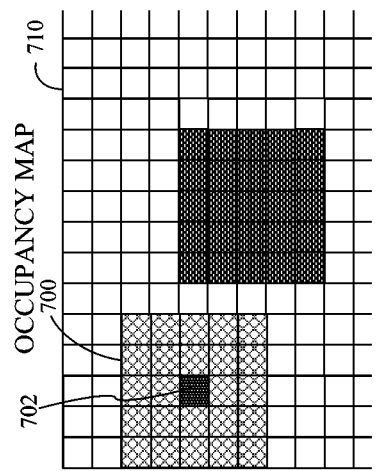
FIG. 7C
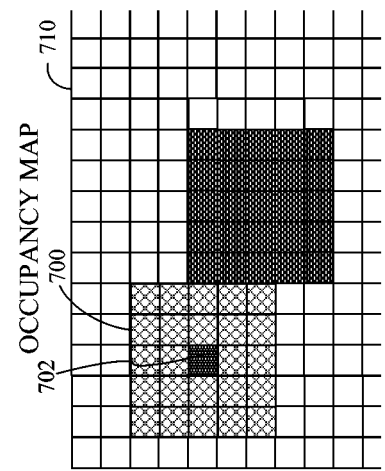
FIG. 7D
X – NON-BOUNDARY POINT
O – BOUNDARY POINT
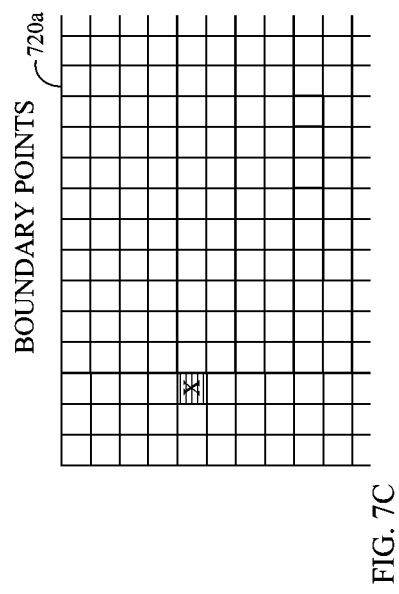
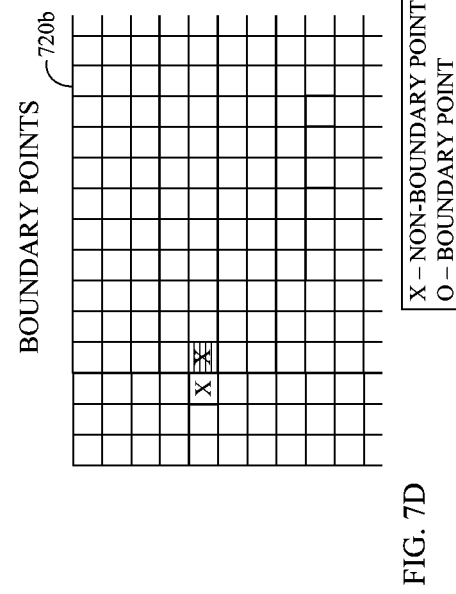

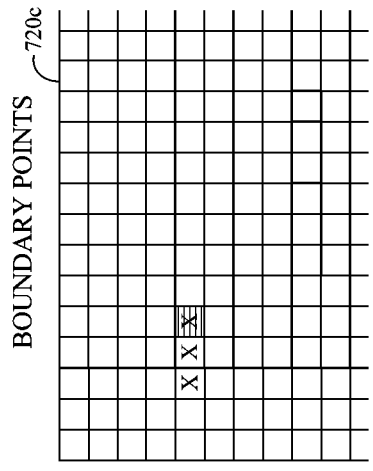
FIG. 7E
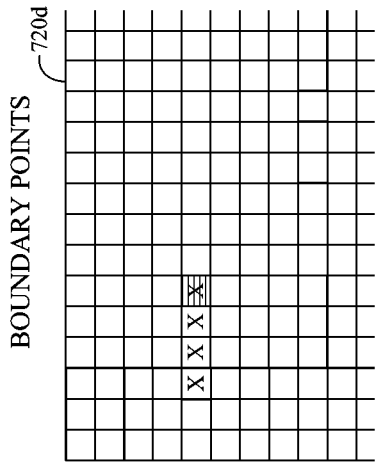
FIG. 7F
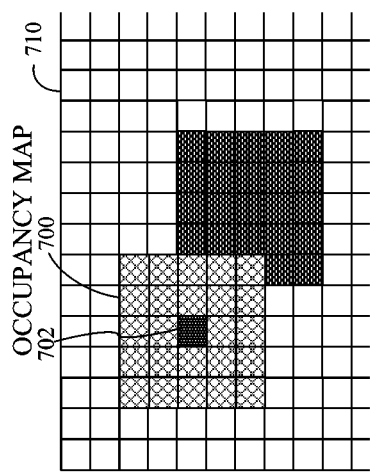
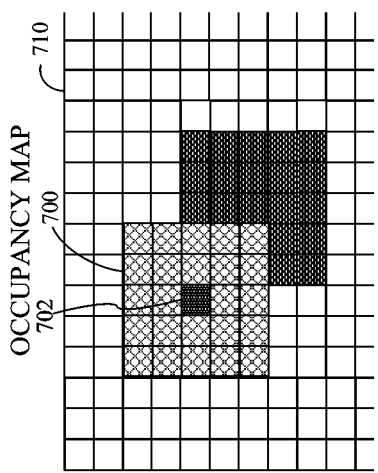

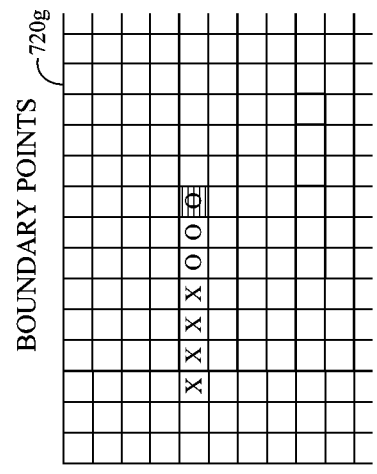
FIG. 7I
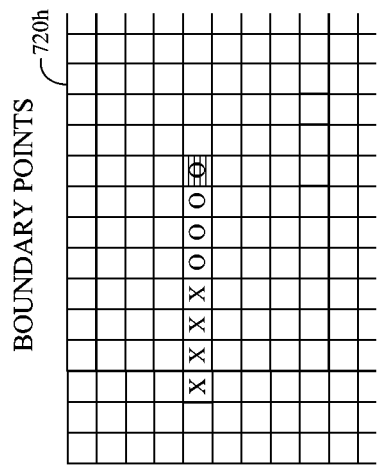
FIG. 7J
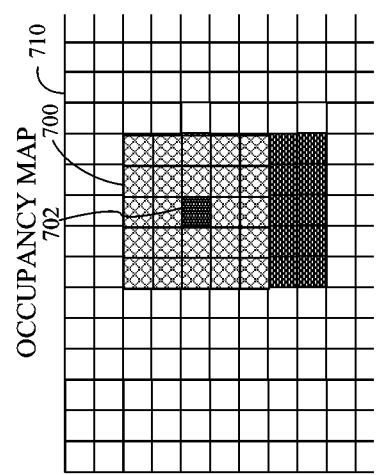
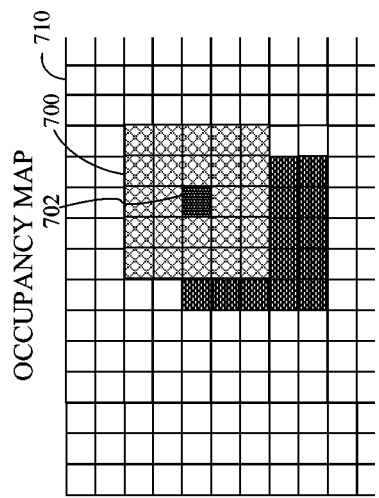

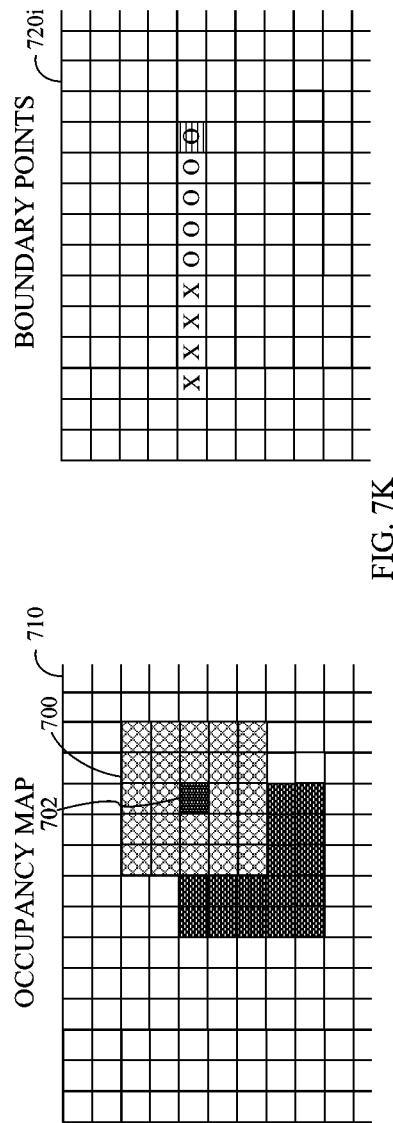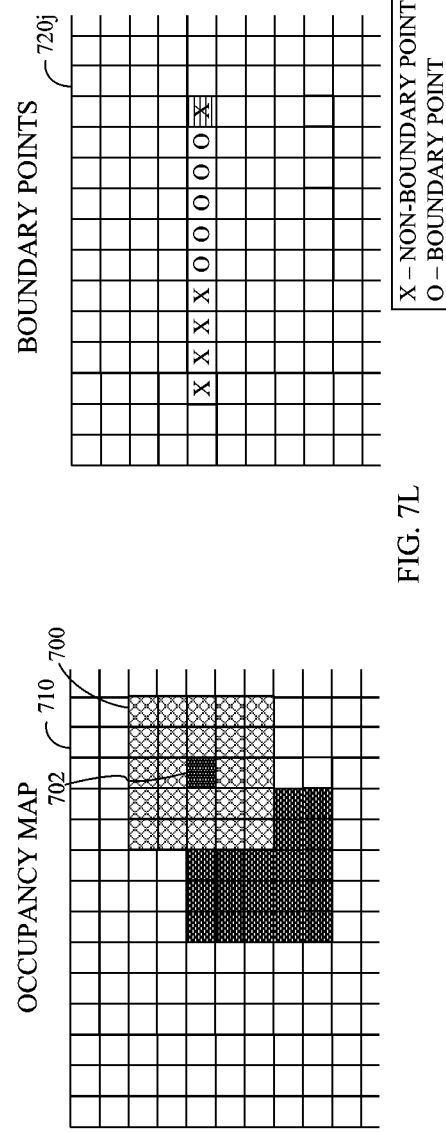
FIG. 7K
FIG. 7L

SINGLE-PASS BOUNDARY DETECTION IN VIDEO-BASED POINT CLOUD COMPRESSION

CROSS-REFERENCE TO RELATED APPLICATION AND CLAIM OF PRIORITY

This application claims priority under 35 U.S.C. § 119(e) to U.S. Provisional Patent Application No. 62/848,188 filed on May 15, 2019, U.S. Provisional Patent Application No. 62/904,244 filed on Sep. 23, 2019, and U.S. Provisional Patent Application No. 62/986,366 filed on Mar. 6, 2020. The above-identified provisional patent applications are hereby incorporated by reference in its entirety.

TECHNICAL FIELD

This disclosure relates generally to multimedia data. More specifically, this disclosure relates to an apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (6 DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) frames that can be compressed and reconstructed on a different device in order to be viewed by a user. Compressing and decompressing the 2D frames can create artifacts that reduce the visual quality of the point cloud.

SUMMARY

This disclosure provides single-pass boundary detection in video-based point cloud compression.

In one embodiment, a decoding device for point cloud decoding is provided. The decoding device includes a communication interface and a processor. The communication interface is configured to receive a bitstream. The processor is configured to decode from the bitstream a first frame that includes pixels. A portion of the pixels of the first frame represent geometric locations of points of the 3D point cloud that are organized into patches corresponding to respective clusters of the points of the 3D point cloud. The processor is also configured to decode from the bitstream a second frame that includes pixels. A portion of the pixels of the second frame represent attribute information of the points of the 3D point cloud, and positions of the pixels in the second frame correspond to respective positions of the pixels in the first frame. The processor is further configured to decode from the bitstream an occupancy map frame. The occupancy map frame includes pixels that identify the portion of the pixels in the first frame that represent the geometric locations of the points of the 3D point cloud and the portion of the pixels in the second frame that represent the attribute information of the points of the 3D point cloud. Additionally, the processor is configured to reconstruct the 3D point cloud using the first frame, the second frame, and the occupancy map frame. The processor is also configured to perform a single pass of the occupancy map frame to identify, based on a value of the pixels within the occupancy map frame, points of the reconstructed 3D point cloud that correspond to a subset of pixels in the first frame and the second frame that are positioned within a proximity threshold to a boundary of any of the patches.

In another embodiment, a method for point cloud decoding is provided. The method includes receiving a bitstream. The method also includes decoding from the bitstream a first frame that includes pixels. A portion of the pixels of the first frame represent geometric locations of points of the 3D point cloud that are organized into patches corresponding to respective clusters of the points of the 3D point cloud. The method additionally includes decoding from the bitstream a second frame that includes pixels. A portion of the pixels of the second frame represent attribute information of the points of the 3D point cloud, and a position of the pixels in the second frame correspond to a respective position of the pixels in the first frame. The method further includes decoding from the bitstream an occupancy map frame. The occupancy map frame includes pixels that identify the portion of the pixels in the first frame that represent the geometric locations of the points of the 3D point cloud and the portion of the pixels in the second frame that represent the attribute information of the points of the 3D point cloud. Additionally, the method includes reconstructing the 3D point cloud using the first frame, the second frame, and the occupancy map frame. The method also includes performing a single pass of the occupancy map frame to identify, based on a value of the pixels within the occupancy map frame, points of the reconstructed 3D point cloud that correspond to a subset of pixels in the first frame and the second frame that are positioned within a proximity threshold to a boundary of any of the patches.

In yet another embodiment, an encoding device for point cloud encoding is provided. The encoding device includes a communication interface and a processor. The processor is configured to generate for a 3D point cloud, a first frame and a second frame. The first frame includes pixels, wherein a portion of the pixels represent geometric locations of points of the 3D point cloud that are organized into patches corresponding to respective clusters of the points of the 3D point cloud. The second frame includes pixels, wherein a portion of the pixels of the second frame represent attribute information of the points of the 3D point cloud. The positions of the pixels in the second frame correspond to respective positions of the pixels in the first frame. The processor is further configured to generate an occupancy map frame. The occupancy map frame includes pixels that identify the portion of the pixels in the first frame that represent the geometric locations of the points of the 3D point cloud and the portion of the pixels in the second frame that represent the attribute information of the points of the 3D point cloud. The processor is additionally configured to encode the first frame to generate a geometry sub-stream, the second frame to generate an attribute sub-stream, and the occupancy map frame to generate an occupancy map sub-stream. In response to decoding the geometry sub-stream, the attribute sub-stream and the occupancy map sub-stream, the processor is configured to reconstruct the 3D point cloud using the first frame, the second frame and the occupancy map frame. Additionally, the processor is configured to perform a single pass of the occupancy map frame to identify, based on a value of the pixels within the occupancy map frame, points of the reconstructed 3D point cloud that correspond to a subset of pixels in the first frame and in the second frame that are positioned within a proximity threshold to a boundary of any of the patches. The processor is further configured to combine the geometry sub-stream, the attribute sub-stream, and the occupancy map sub-stream to generate a bitstream. The communication interface is configured to transmit the bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 7C-7M illustrate an example process of identifying the boundary points by moving the sliding window through an occupancy map to identify boundary points in accordance with an embodiment of this disclosure;

DETAILED DESCRIPTION

Figure 1:
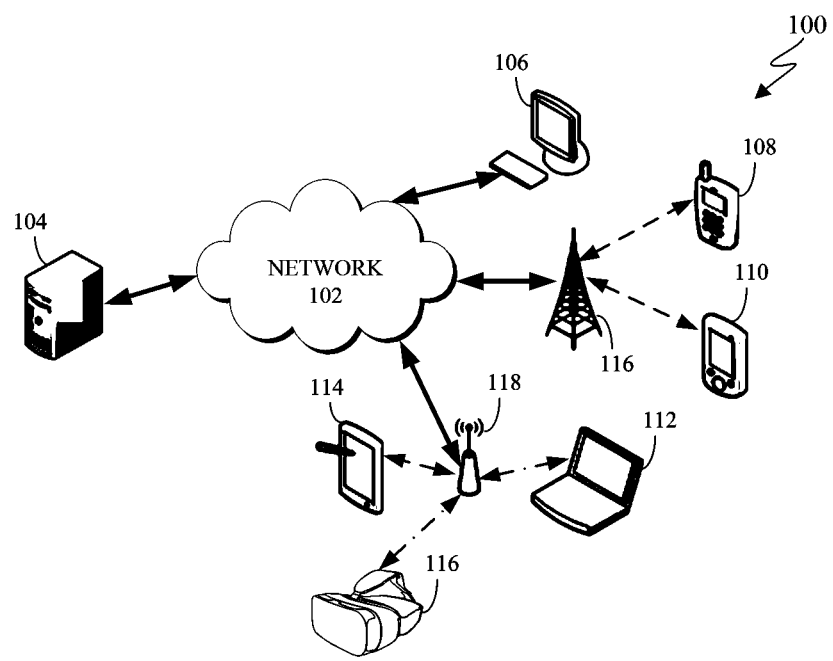
FIG. 1 illustrates an example communication system in accordance with an embodiment of this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real-world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD represents one of many types of devices that provide AR and VR experiences to a user. A HMD is a device that enables a user to view the VR scene and adjust the displayed content based on movements of the head of the user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned in a particular geometric location within 3D space and includes one or more attributes such as color. A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. Point clouds and meshes are commonly used in a variety of applications, including gaming, 3D mapping, visualization, medicine, AR, VR, autonomous driving, multi-view replay, 6 DoF immersive media, to name a few. As used herein, the terms point clouds and meshes can be used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object. In yet other embodiments, the points are positioned along the surface of the object and can be positioned within the internal area of the point cloud In addition to the geometric position of a point (the location of the point in 3D space), each point in the point cloud can also include attributes such as color, texture, reflectance, intensity, surface normal, and the like. In some embodiments, a single point of a 3D point cloud can have multiple attributes. In some applications, point clouds can also be used to approximate light field data in which, each point includes multiple view-dependent, color information (R, G, B or Y, U, V triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D representation to a 2D representation. In certain embodiments, the conversion of a point cloud from a 3D representation to a 2D representation includes projecting clusters of points of the 3D point cloud onto 2D frames by creating patches. Thereafter, video codecs such as HEVC, AVC, VP9, VP8, VVC, and the like can be used to compress the 2D frames representing the 3D point cloud similar to a 2D video.

To transmit a point cloud from one device to another, the 3D point cloud is separated into multiple clusters of points which are represented as patches on 2D frames. The 2D frames can include projections of the 3D point cloud with respect to different projection planes. The frames can include values representing geometry positions of the points. The frames can also represent different attributes of the point cloud. For example, one attribute frame can include values representing color information associated with each of the points. A decoder reconstructs the 3D point cloud using the frames, such that the point cloud can be rendered, displayed, and then viewed by a user.

Figure 4A:
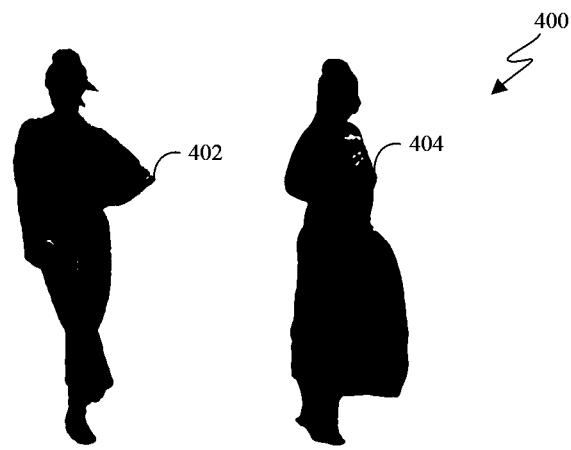
FIG. 4A illustrate an example 3D point cloud in accordance with an embodiment of this disclosure.
Figure 4B:
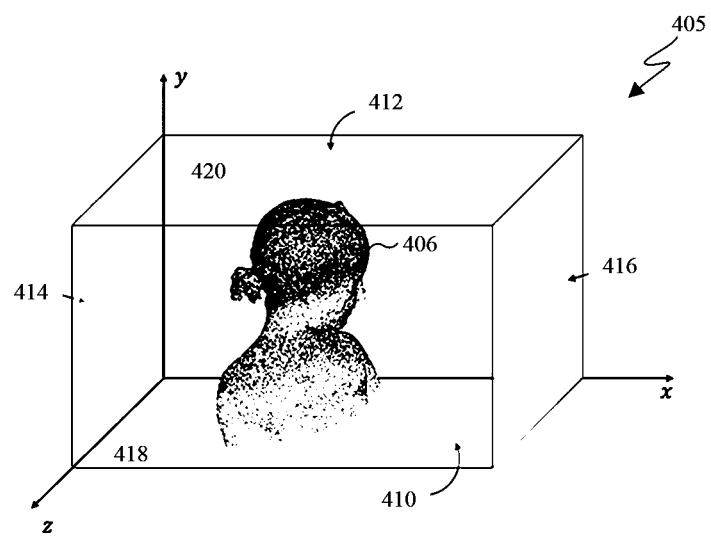
FIG. 4B illustrates a diagram of a point cloud that is surrounded by multiple projection planes in accordance with an embodiment of this disclosure.
Figure 4C:
FIGS. 4C and 4D illustrate example 2D frames that include patches representing the 3D point cloud of FIG. 4A in accordance with an embodiment of this disclosure.
Figure 4D:
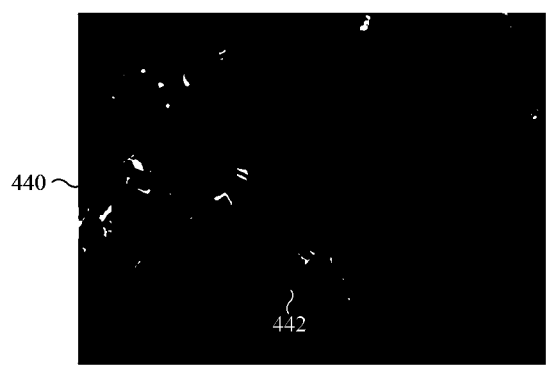

When the point cloud is deconstructed to fit on multiple 2D frames and compressed, the frames can be transmitted using less bandwidth than used to transmit the original point cloud. FIGS. 4A-4D, which are described in greater detail below, illustrate various stages of projecting a point cloud onto different plans and thereafter storing the projections into 2D frames. For example, FIG. 4A, illustrates a two views of a 3D point cloud, illustrating that a point cloud can be a 360° view of an object. FIG. 4B illustrates the process of projecting a 3D point cloud onto different planes. After the point cloud, such as the point cloud of FIG. 4A is projected onto different planes, FIGS. 4C and 4D illustrate a geometry frame and an attribute frame (which represents the color of the points of the 3D point cloud), respectively, which include patches corresponding to the various projections.

Embodiments of the present disclosure provide systems and methods for converting a point cloud into a 2D representation that can be transmitted and then reconstructed into the point cloud for rendering. In certain embodiments, a point cloud is deconstructed into multiple patches which are packed into frames. In certain embodiments, a frame includes patches of the same attributes. The points of the 3D point cloud that are represented in one patch in one frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

An encoder can separate the geometry information and the attribute information from each point. The encoder groups (or clusters) the points of the 3D point cloud with respect to different projection planes, and then stores the groups of points as patches on a 2D frames. The patches representing the geometry and attribute information are packed into geometry video frames and attribute video frames, respectively, where each pixel within any of the patches corresponds to a point in 3D space. The geometry video frames are used to encode the geometry information, and the corresponding attribute video frames are used to encode the attribute (such as color) of the point cloud. The two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

After generating the frames, the frames can be compressed by leveraging various video compression codecs, image compression codecs, or both. For example, the encoder first generates and then compresses the geometry frames using a 2D video codec such as HEVC. To encode an attribute frame (such as the color of the 3D point cloud), the encoder decodes the encoded geometry frame, which is used to reconstruct the 3D coordinates of the 3D point cloud. The encoder smooths the reconstructed point cloud. Thereafter, the encoder interpolates the color values of each point from the color values of original point cloud. The interpolated color values are then packed into a color frame which is compressed.

The encoder can also generate an occupancy map (also referred to an occupancy map frame) which shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud. In certain embodiments, the occupancy map frame is compressed. The compressed geometry frames, the compressed color frames (and any other attribute frame), and the occupancy map frame can be multiplexed to generate a bitstream. The encoder or another device then transmits the bitstream that includes the 2D frames to a different device A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing the geometry as well as different attributes are encoded and decoded separately. In other embodiments, frames representing the geometry as well as different attributes are encoded and decoded together.

Embodiments of the present disclosure provide systems and methods for improving the reconstruction of a 3D point cloud. Improving the reconstruction of a 3D point cloud reduces the processing power necessary for reconstructing 3D point cloud as well as increase the visual quality of the 3D point cloud. For example, smoothing the points of the 3D point cloud that correspond to pixels positioned at or near a patch boundary an improve the visual appearance of the point cloud while the quantity data transmitted representing the point can be decreased.

According to embodiments of the present disclosure, architecture and methods for performing point cloud compression and decompression using a video codec is provided. When a 3D point cloud is converted from a 3D representation to a 2D representation, the points of 3D point cloud are clustered into groups and projected onto frames, where the clustered points result in patches that are packed onto 2D frames. Due to the size constraints of certain 2D frames, two patches that are not next to each other on the 3D point cloud can be packed next to each other in a single frame. When two non-neighboring patches of the point cloud are packed next to each other in a 2D frame, the pixels from one patch can be inadvertently mixed up with the pixels from the other patch by the block-based video codec.

When pixels from one patch are inadvertently included in another patch, visible artifacts can occur at patch boundaries when the point cloud is reconstructed by the decoder.

Therefore, embodiments of the present disclosure provide systems and methods for identifying points of the reconstructed 3D point cloud that are represented by pixels in the frames at or near a patch boundary. The identified point is referred as boundary points as these points are represented by pixels in the frames at or near a patch boundary. Thereafter the boundary points can be smoothed to remove the visual artifact and thereby increasing the visual appearance of the point cloud. When boundary points are identified using a single pass of the occupancy map frame, the runtime of the encoder or decoder can be reduced by more than 30%.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
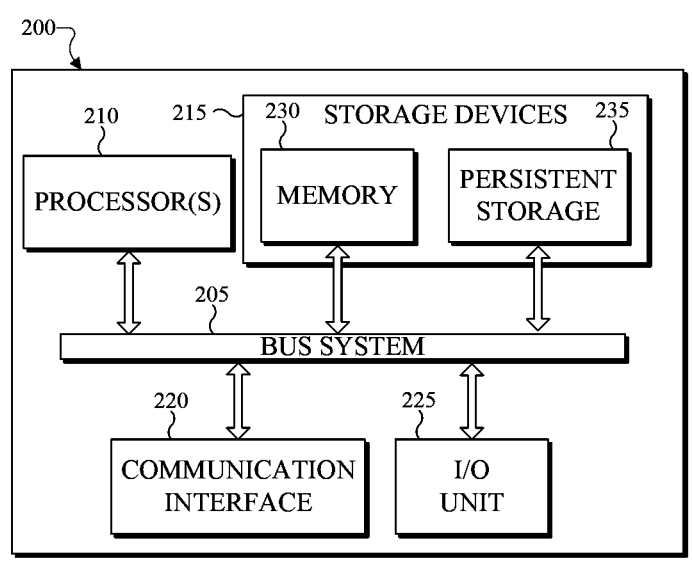
FIGS. 2 and 3 illustrate example electronic devices in accordance with an embodiment of this disclosure.
Figure 3:
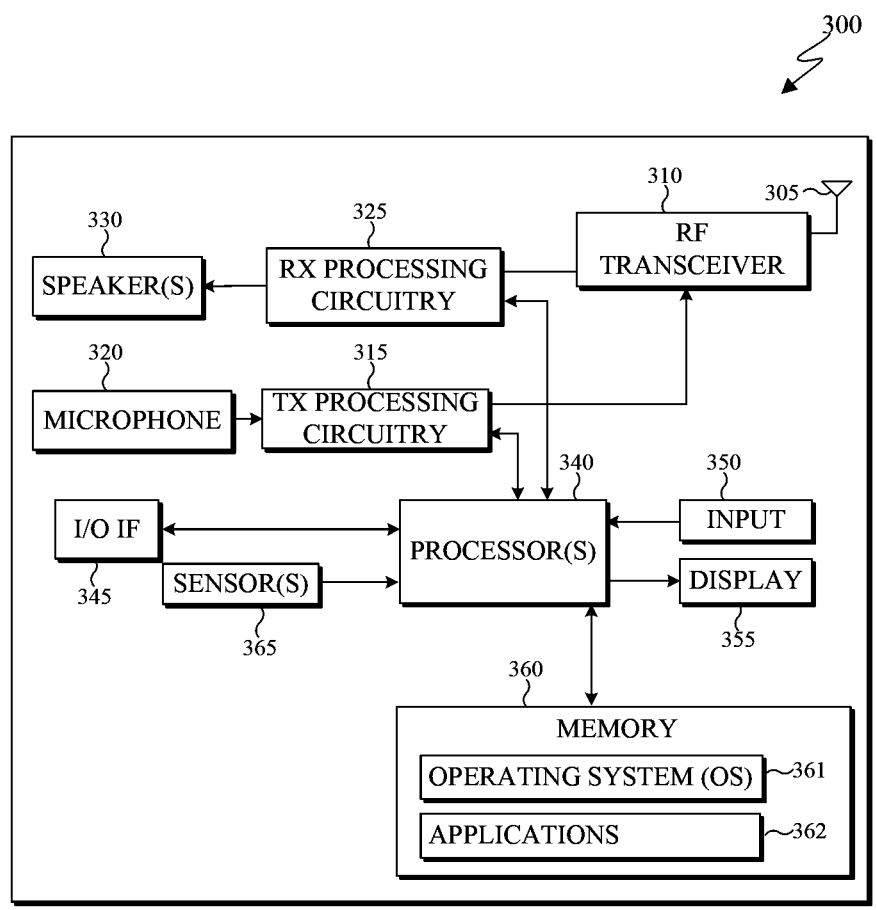

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUS) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 can project the point cloud into multiple patches. For example, a cluster of points of the point cloud can be grouped together and represented as a patch on the 2D frames. A patch can represent a single attribute of the point cloud, such as geometry, color, and the like. Patches that represent the same attribute can be packed into individual 2D frames, respectively. The 2D frames are then encoded to generate a bitstream. During the encoding process additional content such as metadata, flags, occupancy maps, geometry smoothing parameters, one or more attribute smoothing parameters, a patch sub-stream, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information, and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, or quantization parameter size, one or more thresholds, geometry smoothing parameters, one or more attribute smoothing parameters, a patch sub-stream, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4E:
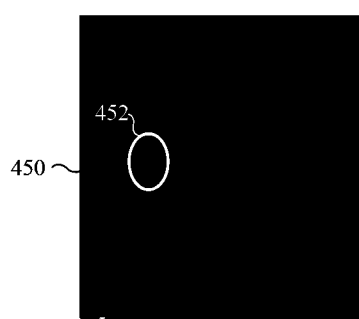
FIG. 4E illustrates an example color artifact in a reconstructed 3D point cloud in accordance with an embodiment of this disclosure.

FIGS. 4A, 4B, 4C, 4D, and 4E illustrate various stages in generating frames that represent a 3D point cloud. In particular, FIG. 4A illustrate an example 3D point cloud 400 in accordance with an embodiment of this disclosure. FIG. 4B illustrates a diagram 405 of a point cloud that is surrounded by multiple projection planes in accordance with an embodiment of this disclosure. FIGS. 4C and 4D illustrate 2D frames that include patches representing the 3D point cloud 400 of FIG. 4A in accordance with an embodiment of this disclosure. For example, the FIG. 4C illustrates a 2D frame 430 that represents the geometric position of points of the 3D point cloud 400, while the FIG. 4D illustrates the frame 440 that represents the color (or another attribute) associated with points of the 3D point cloud 400. FIG. 4E illustrates an example color artifact in a reconstructed point cloud 450. In certain embodiments, the reconstructed point cloud 450 is similar to the 3D point cloud 400 of FIG. 4A.

The 3D point cloud 400 of FIGURE A is a set of data points in 3D space. Each point of the 3D point cloud 400 includes a geometric position that provides the structure of the 3D point cloud and one or more attributes that provide information about each point such as color, reflectiveness, material, and the like. The 3D point cloud 400 represents the entire 360° object. That is, the point cloud can be viewed from various angles such as the front 402, the sides, and the back 402, the top, the bottom.

The diagram 405 of FIG. 4B includes a point cloud 406. The point cloud 406 can be similar to the 3D point cloud 400 of FIG. 4A. That is, the point cloud 406 represents an entire 360° object. The point cloud 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape of that the projection planes form can differ.

During the segmentation process, each of the points of the point cloud 406 are assigned to a particular projection plane, (such as the projection planes 410, 412, 414, 416, 418, and 420). The points that are near each other and are assigned to the same projection plane are grouped together to form a cluster which is represented as a patch such as any of the patches as illustrated in FIGS. 4C and 4D.

FIGS. 4C and 4D illustrate the 2D frames 430 and 440, respectively. The frame 430 is a geometry frame as it provides the geometric location of each point of the 3D point cloud 400 of FIG. 4A. The frame 430 includes multiple patches (such as a patch 432) representing the depth values of the 3D point cloud 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D point cloud 400 of FIG. 4A. The frame 440 includes multiple patches (such as a patch 442) representing values corresponding to the color of a point in the 3D point cloud 400.

Each of the patches in FIGS. 4C and 4D can be identified by an index number. Similarly, each pixel within a patch can be identified by its location within the frame as well as the index number of the patch to which the pixel is within.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point in 3D space, and each pixel within in the patch 442 provides a color to a point of the 3D point cloud that is represented at the same location in the patch 432. As shown in the frames 430 and 440, some of the pixels correspond to valid pixels that represent the 3D point cloud 400 while other pixels (the black area in the background) correspond to invalid pixels that do not represent the 3D point cloud 400.

Non-neighboring points in 3D space could end up being represented as pixels that are next to each other in the frames 430 and 440. For example, two clusters of points that are not next to each other in 3D space could be represented as patches that are adjacent to one another in the frames 430 and 440.

The frames 430 and 440 can be encoded with a video codec such as HEVC, AVC, VP9, VP8, VVC, AV1, and the like. A decoder receives a bitstream that includes the frames 430 and 440 and reconstructs the geometry of the 3D point cloud from the frame 430 and colors the geometry of the point cloud based on the frame 440 in order to generate the reconstructed point cloud 450, as shown in FIG. 4E.

The reconstructed point cloud 450 of FIG. 4E should be similar the 3D point cloud 400. When the frames 430 and 440 are encoded and compressed, the values corresponding to pixels could be mixed up by a block-based video codec. If the pixels within a single patch of the frame 430 get mixed up, the effect is often negligible when the point cloud is reconstructed as colors next to each other within a patch are often similar. However, if pixels at a boundary of one of the patches of the frame 430, such as the patch 432, get mixed up with pixels of another patch, an artifact, similar to the artifact 452 as shown in FIG. 4E, can be created when the point cloud is reconstructed. Since the patches could be from drastically different parts of the point cloud, the coloring of the patches could be different. In a block-based video codec, a coding block may contain pixels from patches with very different coloring. This leads to leaking of color from patch to another patch with very different texture. As a result, visual artifacts are created which reduce the visual quality of the point cloud. Similarly, if pixels at a boundary of one of the patches gets mixed up with an empty pixel (indicated by the black background and does not correspond to a point of the point cloud), an artifact can be created when the point cloud is reconstructed, since a point, corresponding to a pixel that was switched with a blank pixel, would not be reconstructed.

The reconstructed point cloud 450 illustrates the artifact 452. The artifact 452 can be created when a patch corresponding to the forehead of the model represented in the 3D point cloud 400 is packed into the frame 430 next to a patch that corresponds to another part of the 3D point cloud 400, such as the dress of the model represented in the 3D point cloud 400. As such, color values of a patch that represents a portion of the dress could leak to the patch corresponding to the forehead of the model represented in the 3D point cloud 400. In this example, the mix up of the color values results in an artifact that appear as a crack or hole in the face of the user which reduces the visual quality of the reconstructed point cloud 450. Embodiments of the present disclosure provide systems and methods for removing artifacts by smoothing the reconstructed point cloud at areas of an artifact while maintaining the quality of the point cloud. For example, points near patch boundaries of the reconstructed the point cloud are identified and smoothed.

Although FIGS. 4A, 4B, 4C, and 4D illustrate example point cloud and 2D frames representing a point cloud various changes can be made to FIGS. 4A, 4B, 4C, and 4D. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, and 4D do not limit this disclosure to any particular 3D object(s) and 2D frames representing the 3D object(s).

Figure 5A:
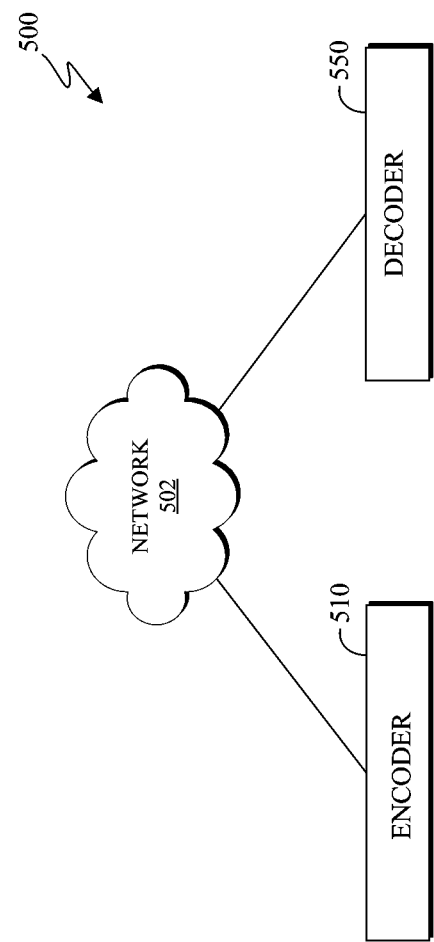
FIG. 5A illustrates a block diagram of an example environment-architecture in accordance with an embodiment of this disclosure.
Figure 5B:
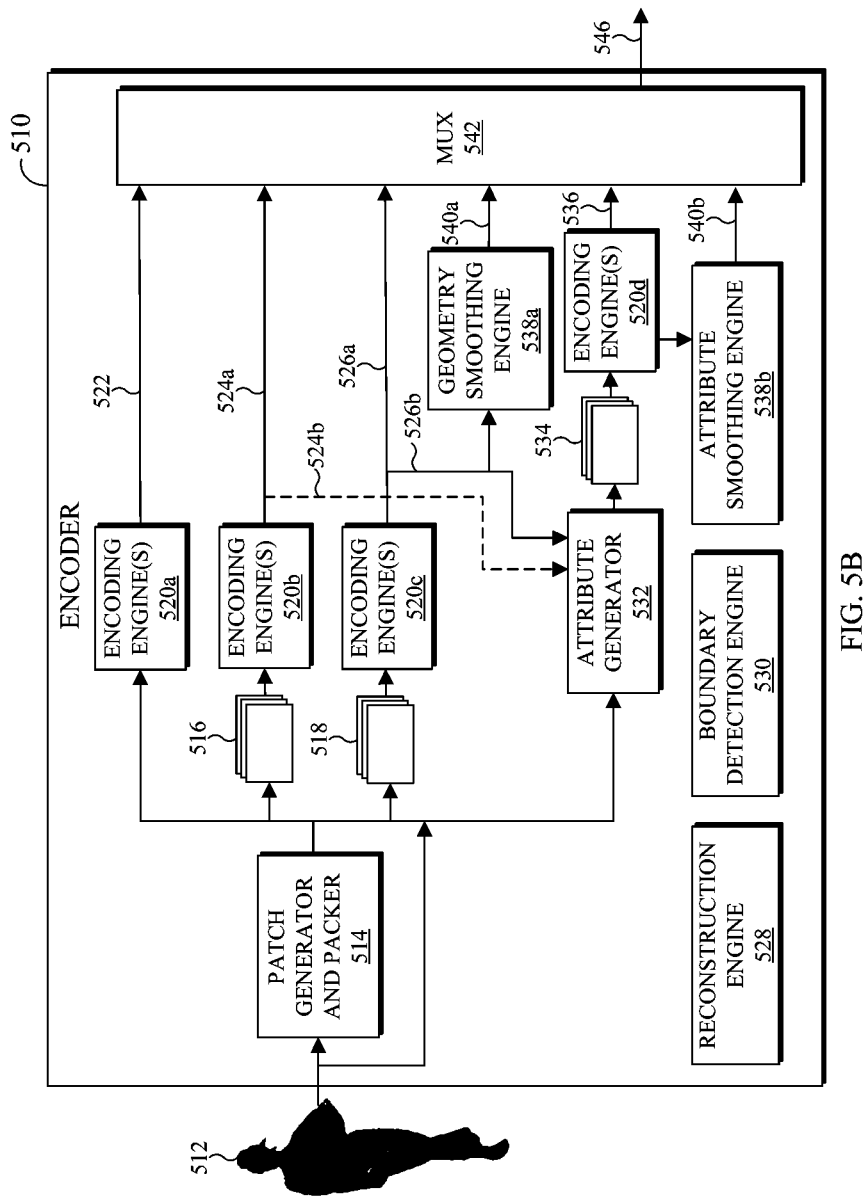
FIG. 5B illustrates an example block diagram of an encoder in accordance with an embodiment of this disclosure.
Figure 5C:
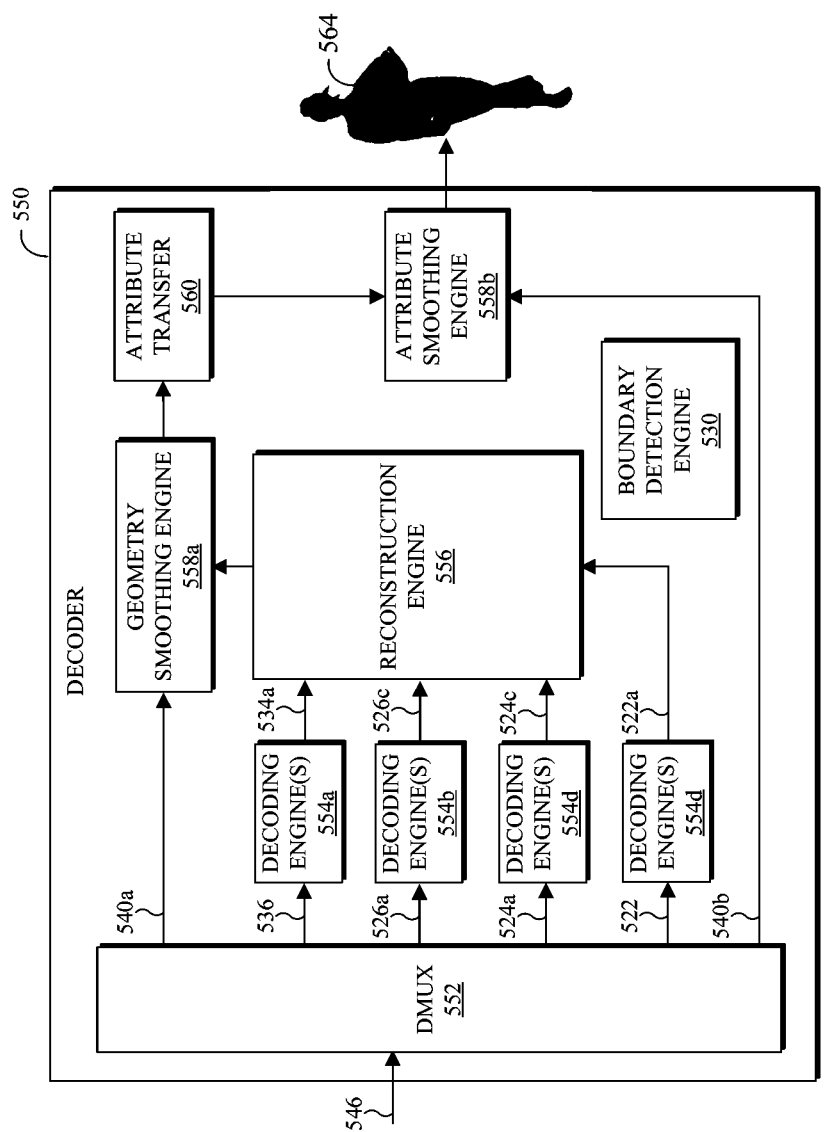
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receives 3D media content, such as a point cloud, from another device such as a server (similar to the server 104 of FIG. 1, the server 200 of FIG. 2) or an information repository (such as a database), or one of the client devices 106-116. In certain embodiments, the encoder 510 can receive media content from multiple cameras and stitch the content together to generate a 3D scene that includes one or more point clouds.

The encoder 510 projects a points of the point cloud into multiple patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 can project a point cloud into two dimensions on a 2D frame. It is noted, a point of the 3D point cloud is located in 3D space based on a (X, Y, Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

The encoder 510 packs the patches representing the point cloud onto 2D frames. The 2D frames can be video frames. Each of the 2D frames represents a particular attribute, such as one set of frames can represent geometry and another set of frames can represent an attribute (such as color). It should be noted that additional frames can be generated based on more layers as well as each additionally defined attribute.

The encoder 510 also generates an occupancy map based on the geometry frame and the attribute frame(s) to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v). In certain embodiments, the occupancy map at a position (u, v) can be one or zero. Generally, the occupancy map is binary, such that the value of each pixel is either one or zero. When the value of a pixel at position (u, v) of the occupancy map is one indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid.

In certain embodiments, the encoder 510 reconstructs the point cloud using the geometry frame, the attribute frame, and the occupancy map frame. The encoder 510 can identify points on the reconstructed 3D point cloud that were represented on or near a boundary of one of the patches on one of the frames. Thereafter, the encoder 510 can determine whether to perform smoothing with respect to the identified boundary points.

The encoder 510 transmits frames representing the point cloud as an encoded bitstream. The bitstream can also include parameters from the smoothing if smoothing is performed on some or all of the identified boundary points. The bitstream can be transmitted to an information repository (such as a database) or an electronic device that includes a decoder (such as the decoder 550), or the decoder 550 itself through the network 502. The encoder 510 is described in greater detail below in FIG. 5B.

The decoder 550, which is described with more below in FIG. 5C, receives a bitstream that represents media content, such as a point cloud. The bitstreams can include data representing a 3D point cloud. In certain embodiments, the decoder 550 can decode the bitstream and generate multiple frames such as one or more geometry frames, one or more attribute frames, and one or more occupancy map frames. The decoder 550 reconstructs the point cloud using the multiple frames, which can be rendered and viewed by a user The decoder 550 can identify points on the reconstructed 3D point cloud that were represented on or near a boundary of one of the patches on one of the frames. Thereafter, the decoder 550 can determine whether to perform smoothing with respect to the identified boundary points.

FIG. 5B illustrates the encoder 510 that receives a 3D point cloud 512 and generates a bitstream 546. The bitstream 546 includes data representing a 3D point cloud 512. The bitstream 546 can include multiple bitstreams and can be transmitted via the network 502 of FIG. 5A to another device, such as the decoder 550 or an information repository. The encoder 510 includes a patch generator and packer 514, one or more encoding engines (such as encoding engine 520a, 520b, 520c, and 520d, which are collectively referred to as encoding engines 520), a reconstruction engine 528, a boundary detection engine 530, a geometry smoothing engine 538a, an attribute smoothing engine 538b, and a multiplexer 542.

The 3D point cloud 512 can be stored in memory (not shown) or received from another electronic device (not shown). The 3D point cloud 512 can be a single 3D object (similar to the 3D point cloud 400 of FIG. 4A), or a grouping of 3D objects. The 3D point cloud 512 can be a stationary object or an object which moves.

The patch generator and packer 514 generates patches by taking projections of the 3D point cloud 512 and packs the patches into frames. In certain embodiments, the patch generator and packer 514 splits the geometry information and attribute information of each point of the 3D point cloud 512. The patch generator and packer 514 can use two or more projection planes (such as two or more the projection plans 410-420 of FIG. 4B), to cluster the points of the 3D point cloud 512 to generate the patches. The geometry patches are eventually packed into the geometry frames 518.

The patch generator and packer 514 determines the best projection plane for each point of the 3D point cloud 512. When projected, each cluster of points of the 3D point cloud 512 appears as patch (also referred to as a regular patch). A single cluster of points can be represented by multiple patches (located on different frames), where each patch represents a particular aspect of each point within the cluster of points. For example, a patch representing the geometry locations of the cluster of points is located on the geometry frame 518, and patch representing an attribute of the cluster of points is located on the attribute frame 534.

After determining the best projection plane for each point of the 3D point cloud 512 the patch generator and packer 514 segments the points into patch data structures that are packed frames, such as the geometry frames 518. As illustrated in FIGS. 4C and 4D, discussed above, the patches are organized by attributes and places the patches within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The patch generator and packer 514 also generates patch information (providing information about the patches, such as an index number that is associated with each patch), occupancy map frames 516, geometry frames 518 and attribute information (which is used by the attribute generator 532 to generate the attribute frames 534).

The occupancy map frames 516 represent occupancy maps that indicate the valid pixels in the frames (such as the geometry frames 518). For example, the occupancy map frames 516 indicate whether each pixel in the geometry frame 518 is a valid pixel or an invalid pixel. Each valid pixel in the occupancy map frames 516 corresponds to pixels in the geometry frames 518 that represents a position point of the 3D point cloud 512 in 3D space. In contrast, the invalid pixels are pixels within the occupancy map frames 516 correspond to pixels in the geometry frames 518 that do not represent a point of the 3D point cloud 512 (such as the empty/black space in the frames 430 and 440 of FIGS. 4C and 4D). In certain embodiments, one of the occupancy map frames 516 can correspond to both a geometry frame 518 and an attribute frame 534 (discussed below).

For example, when the patch generator and packer 514 generates the occupancy map frames 516, the occupancy map frames 516 include predefined values for each pixel, such as zero or one. For example, when a pixel of the occupancy map at position (u, v) is a value of zero, indicates that the pixel at (u, v) in the geometry frame 518 is invalid. Similarly, when a pixel of the occupancy map at position (u, v) is a value of one, indicates that the pixel at (u, v) in the geometry frame 518 is valid and thereby includes information representing a point of the 3D point cloud.

The geometry frames 518 include pixels representing the geometry values of the 3D point cloud 512. The geometry frames 518 include the geographic location of each point of the 3D point cloud 512. The geometry frames 518 are used to encode the geometry information of the point cloud. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

The encoder 510 includes one or more encoding engines. For example, the encoder 510 can include the encoding engine 520a, the encoding engine 520b, the encoding engine 520c, and the encoding engine 520d (collectively referred to as the encoding engines 520). In certain embodiments, a single encoding engine performs the operations of all of the individual encoding engines 520. In certain embodiments, the encoding engines 520 can be configured to support an 8-bit, a 10-bit, a 12-bit, a 14-bit, or a 16-bit, precision of data. The encoding engines 520 can include a video or image codec such as HEVC, AVC, VP9, VP8, VVC, EVC, AV1 and the like to compress the 2D frames representing the 3D point cloud.

One or more of the encoding engines 520 can compress the information in a lossy or lossless manner.

In certain embodiments, the information (such as the patch information, the occupancy map frames 516, the geometry frames 518, and the attribute frames 534) are encoded by independent encoding engines 520, as illustrated. For example, the encoding engine 520a receives patch sequence information and performs patch sequence compression to generate a patch sub-stream 522. The encoding engine 520b receives occupancy map frames 516 performs occupancy map compression to generate an occupancy map sub-stream 524a. The encoding engine 520c receives geometry frames 518 performs geometry compression to generate a geometry sub-stream 526a. The encoding engine 520d receives attribute frames 534 performs attribute compression to generate an attribute sub-stream 536.

In certain embodiments, the encoding engine 520b, the encoding engine 520c, and the encoding engine 520d can encode the occupancy map frames 516, the geometry frames 518, and the attribute frames 534, at lower resolutions. The lower resolution could result in the overall size of the frames being reduced. When the occupancy map frames 516, the geometry frames 518, and the attribute frames 534 are encoded at a lower resolution, the frames would need to be up-sampled to the original size of the frames after the frames are decoded, by the decoding engines of the decoder 550 of FIG. 5C.

After the encoding engine 520b generates the occupancy map sub-stream 524a, a decoding engine (not shown) can decode the occupancy map sub-stream 524a to generate the reconstructed occupancy map frames 524b. Similarly, after the encoding engine 520c generates the geometry sub-stream 526a, a decoding engine (not shown) can decode the geometry sub-stream 524a to generate the reconstructed geometry frames 526b. In certain embodiments, the reconstruction engine 528 reconstructs the geometric positions of the points of the 3D point cloud, based on the reconstructed occupancy map frames 524b and the reconstructed geometry frames 526b.

The attribute generator 532 generates the attribute frames 534. The attribute generator 532 can generate the attribute frames 534 based on the attribute information from the 3D point cloud 512, the reconstructed occupancy map frames 524b, the reconstructed geometry frames 526b, and information provided by the patch generator and packer 514.

For example, to generate one of the attribute frames 534 that represent color, the geometry frames 518 are compressed by the encoding engine 520c using a 2D video codec such as HEVC. The geometry sub-stream 526a is decoded and the geometry of the 3D point cloud is reconstructed, by the reconstruction engine 528. The reconstruction engine 528 reconstructs the geometric locations of the points of the 3D point cloud based on the reconstructed geometry frames 526b. The attribute generator 532 interpolates the attribute values (such as color) of each point from the color values of input point cloud to the reconstructed point cloud (and, if smoothing was performed, the smoothed geometry coordinates of point cloud). The interpolated colors are then segmented, by the attribute generator 532, to match the same patches as the geometry information. The attribute generator 532 then packs interpolated attribute values into an attribute frame 534 representing color.

The attribute frames 534 represents different attributes of the point cloud. For example, for one of the geometry frames 518 there can be one or more corresponding attribute frames 534. The attribute frame can include color, texture, normal, material properties, reflection, motion, and the like. In certain embodiments, one of the attribute frames 534 can include color values for each of the geometry points within one of the geometry frames 518, while another attribute frame can include reflectance values which indicate the level of reflectance of each corresponding geometry point within the same geometry frame 518. Each additional attribute frame 534 represents other attributes associated with a particular geometry frame 518. In certain embodiments, each geometry frame 518 has at least one corresponding attribute frame 534.

When the occupancy map frames 516, the geometry frames 518, and the attribute frames 534, are encoded by the encoding engines 520, and later decoded at the decoder 550, pixels from one patch can be inadvertently included in another patch. As a result, visible artifacts can appear in the reconstructed point cloud, reducing the visual quality of the point cloud. For example, pixels within the geometry frame 518 can shift slightly due to the encoding and decoding process. Generally, a slight shift may not significantly reduce the visual quality of the point cloud when the pixel is in the middle of a patch. However, a slight shifting or switching of a pixel off of a patch to a location that is indicated as empty (or invalid) by the occupancy map, can cause considerable artifacts, since a portion of the image would not be rendered. Similarly, a slight shifting or switching of a pixel from one patch to another patch can cause considerable artifacts. For example, if one patch, which includes the face of the 3D point cloud 400 of FIG. 4A, is packed next to a patch that includes the dress of the 3D point cloud 400 and the encoding/decoding process results with a grouping of pixels moving from one patch to the other, then the reconstructed point cloud would have a pixels corresponding to a face on the dress and conversely, pixels corresponding to the dress on the face of the reconstructed and rendered point cloud. Such a shift could cause a visible artifact that reduces the visual quality of the point cloud.

In order to reduce the appearance of artifacts, points of the 3D point cloud that are represented in the 2D frames as pixels which are near a boundary of a patch can be smoothed. To reduce the occurrence or appearance of a visual artifact and increase compression efficiency, the smoothing can be applied to the positions of the points of the point cloud, each identified attribute of the point cloud (such as color, reflectiveness, and the like), or both the geometry and the attributes of the point cloud.

In order to smooth the geometry, the attribute, or both the geometry and attribute of the 3D point cloud, the encoder 510, via the boundary detection engine 530 identifies the pixels within the geometry frames 518 and the attribute frames 534 which are positioned at or near the boundary of each patch. In certain embodiments, after the encoding engine 520d generates the attribute sub-stream 536, a decoding engine (not shown) can decode the attribute sub-stream 536 to generate the reconstructed attribute frames. The reconstructed attribute frames can be used to reconstruct the 3D point cloud by applying the attribute information to the points of the reconstructed 3D point cloud. Thereafter, the boundary detection engine 530 identifies the pixels within the reconstructed geometry frames 526b and the reconstructed attribute frames which are positioned at or near the boundary of each patch.

The boundary detection engine 530 inspects the pixels of the reconstructed occupancy map frames 524b to identify boundaries of the patches within the reconstructed geometry frames 526b. Alternatively, the boundary detection engine 530 inspects the pixels of the occupancy map frames 516 to identify boundaries of the patches within the geometry frames 518.

The boundary detection engine 530 performs a single pass over the occupancy map frames to identify a subset of pixels that correspond to points of the point cloud that are positioned at or near a boundary of a patch in the 2D frames. To identify a boundary point of the point cloud, the boundary detection engine 530 inspects the pixels within the reconstructed occupancy map frames 524b that are neighbor a query pixel. For example, the boundary detection engine 530 identifies, based on a value of the pixels within the occupancy map frame, points of the reconstructed 3D point cloud that correspond to a subset of pixels in the geometry frames 518 that are positioned within a proximity threshold to a boundary of any of the patches. The subset of pixels includes one or more pixels that are a predefined distance from the query pixel. For example, the distance can include pixels within one-pixel distance from a query pixel, two-pixel distance from the query pixel, three-pixel distance from the query pixel, and the like. As the distance increases, the number of identified boundary points will also increase.

The boundary detection engine 530 inspects each pixel within the occupancy map frames 516. The inspection includes selecting a query pixel and identifying whether the query pixel is valid, based on the value of the query pixel. If the query pixel is invalid, the boundary detection engine 530 continues selecting new pixels within the occupancy map frames 516 until a valid query pixel is identified.

Figure 7A:
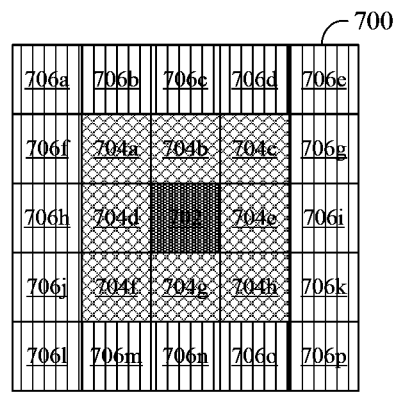
FIG. 7A illustrates an example sliding window for identifying boundary points in accordance with an embodiment of this disclosure.

Upon identifying a valid query pixel, the boundary detection engine 530 inspects a first layer of pixels around the query pixel. The first layer of pixels includes any pixel that is adjacent to (neighbor) and touches the query pixel. For example, if the query pixel in in the middle of one of the occupancy map frames 516, then there are eight neighboring pixels. FIG. 7A, discussed in greater detail below illustrates the first layer of pixels 704 that surround a query pixel 702.

The boundary detection engine 530 inspects the first layer of pixels to determine whether any of the first layer of pixels are invalid. The boundary detection engine 530 also inspects the first layer of pixels to determine whether any of the neighboring pixels belong to a patch which is different than the patch to which the query pixel belongs. If the value of any of the pixels in the first layer indicates an invalid pixel, then the query pixel is identified as a boundary pixel. Similarly, if any of the pixels in the first layer belong to a different patch than the patch which the query pixel belongs to, then the query pixel is identified also as a boundary pixel.

The boundary detection engine 530 also inspects the first layer of pixels to determine whether any of the neighboring pixels are positioned at the edge of one of the occupancy map frame 516. If any of the pixels in the first layer are located at the edge of the occupancy map frame 516, then the query pixel is identified as a boundary pixel. For example, if there are typically eight pixels in the first layer, and the boundary detection engine 530 identifies less than eight pixels in the first layer, then the query pixel is identified as a boundary pixel Upon identifying the query pixel as a boundary pixel, the boundary detection engine 530 identifies a point of the 3D point cloud (that corresponds to the query pixel) as a query point.

If all of the pixels in the first layer are valid, belong to the same patch as the query pixel, and are not located at the edge of the occupancy map frame 516, then the boundary detection engine 530 also inspects the second layer of pixels around the query pixel.

For example, if the query pixel in in the middle of one of the occupancy map frames 516, then there are sixteen neighboring pixels. FIG. 7A, discussed in greater detail below illustrates the second layer of pixels 706 that surround a query pixel 702. The second layer of pixels are adjacent to and touch the first layer of pixels, such that the second layer of pixels are a distance of two pixels from the query point.

The boundary detection engine 530 inspects the second layer of pixels to determine whether any of the second layer of pixels are invalid. The boundary detection engine 530 also inspects the second layer of pixels to determine whether any of the neighboring pixels (in the second layer) belong to a patch which is different than the patch to which the query pixel belongs. If the value of any of the pixels in the second layer indicates an invalid pixel, then the query pixel is identified as a boundary pixel. Similarly, if any of the pixels in the second layer belong to a different patch than the patch which the query pixel belongs to, then the query pixel is identified also as a boundary pixel.

The boundary detection engine 530 also inspects the second layer of pixels to determine whether any of the neighboring pixels are positioned at the edge of one of the occupancy map frame 516. If any of the pixels in the second layer are located at the edge of the occupancy map frame 516, then the query pixel is identified as a boundary pixel. For example, if there are typically sixteen pixels in the second layer, and the boundary detection engine 530 identifies less than sixteen pixels, then the query pixel is identified as a boundary pixel Upon identifying the query pixel as a boundary pixel, the boundary detection engine 530 identifies a point of the 3D point cloud (that corresponds to the query pixel) as a query point. If all of the pixels in the second layer are valid, belong to the same patch as the query pixel, and are not located at the edge of the occupancy map frame 516, then the boundary detection engine 530 then selects a new valid query pixel. The boundary detection engine 530 continues selecting new query pixels until all of the points of the point cloud are inspected. In certain embodiments, the boundary detection engine 530 continues selecting new query pixels until all of the occupancy map frames 516 are inspected.

Syntax (1) below, is provided to illustrate identifying the boundary points of the 3D point cloud using the single-pass process. The inputs to Syntax (1) include (i) an occupancy map frame oFrame[i][j], i=0 . . . asps_frame_height−1, j=0 . . . asps_frame_width−1, (ii) x, the column index of the reconstructed point on the canvas, and (iii) y, the row index of the reconstructed point on the canvas. The output of Syntax (1) is the variable boundaryPoint, which is a Boolean variable that identifies if a point is located near a patch boundary which is used to indicate whether the reconstructed point is relevant to geometry or attribute smoothing.

```
Syntax                                                                    (1)
boundaryPoint = 0;
   if( ( oFrame[ y ][ x − 1 ] = = 0 ) | | ( oFrame[ y ][ x + 1 ] = = 0 ) | |
      ( oFrame[ y − 1 ][ x ] = = 0 ) | | ( oFrame[ y + 1 ][ x ] = = 0 ) | |
      ( oFrame[ y − 1 ][ x − 1 ] = = 0 ) | | ( oFrame[ y − 1 ][ x + 1] = = 0 ) | |
      ( oFrame[ y + 1 ][ x − 1 ] = = 0 ) | | ( oFrame[ y + 1 ][ x + 1] = = 0 ) )
      boundaryPoint = 1
   if( boundaryPoint ! = 1 )
      if ( ( oFrame[ y − 2 ][ x − 2 ] = = 0 ) | | (oFrame[ y − 2 ][ x − 1 ] = = 0 ) | |
         ( oFrame[ y − 2 ][ x ] = = 0 ) | | ( oFrame[ y − 2 ][ x + 1 ] = = 0 ) | |
         ( oFrame[ y − 2 ][ x + 2 ] = = 0) | | ( oFrame[ y − 1 ][ x − 2 ] = = 0 ) | |
         ( oFrame[ y − 1 ][ x + 2 ] = = 0) | | ( oFrame[ y ][ x − 2 ] = = 0 ) | |
         ( oFrame[ y ][ x + 2 ] = = 0) | | ( oFrame[ y + 1 ][ x − 2 ] = = 0 ) | |
         ( oFrame[ y + 1][ x + 2 ] = = 0) | | ( oFrame[ y + 2 ][ x − 2 ] = = 0 ) | |
         ( oFrame [ y + 2 ][ x − 1 ] = = 0) | | ( oFrame[ y + 2 ][ x ] = = 0 ) | |
         ( oFrame [ y + 2 ][ x + 1 ] = = 0) | | ( oFrame[ y + 2 ][ x + 2 ] = = 0 ) )
         boundaryPoint = 1
```

Additionally, with respect to Syntax (1) above, if i is not in the range of 0 to (asps_frame_height−1), inclusive, or j is not in the range of 0 to (asps_frame_width−1), inclusive, the oFrame[i][j] is assumed to be equal to 0

After the boundary detection engine 530 identifies the subset of pixels that are within a proximity threshold to a boundary of any of the patches, the geometry smoothing engine 538a and the attribute smoothing engine 538b can perform a smoothing to the identified points of the 3D point cloud. To perform the smoothing, generated smoothing parameters (such as the geometry smoothing parameters 540a and attribute smoothing parameters 540b) are generated.

The multiplexer 542 combines the patch sub-stream 522, the occupancy map sub-stream 524a, the geometry sub-stream 526a, the geometry smoothing parameters 540a, the attribute sub-stream 536, and the attribute smoothing parameters 540b create the bitstream 546.

FIG. 5C illustrates the decoder 550 that includes a demultiplexer 552, one or more decoding engines (such as a decoding engine 554a, a decoding engine 554b, a decoding engine 554c, and a decoding engine 554d), a reconstruction engine 556, a geometry smoothing engine 558a, an attribute smoothing engine 558b and a boundary detection engine 530.

The decoder 550 receives a bitstream 546, such as the bitstream that was generated by the encoder 510. The demultiplexer 552 separates bitstream 546 into one or more sub-streams representing the different information. For example, the demultiplexer 552 separates various streams of data such into the individual sub-streams such as the patch sub-stream 522, the occupancy map sub-stream 524a, the geometry sub-stream 526a, the attribute sub-stream 536, the geometry smoothing parameters 540a, and the attribute smoothing parameters 540b.

The decoder 550 includes one or more decoding engines. For example, the decoder 550 can include the decoding engine 554a, a decoding engine 554b, a decoding engine 554c, and a decoding engine 554d (collectively referred to as the decoding engines 554). In certain embodiments, a single decoding engine performs the operations of all of the individual decoding engines 554.

The decoding engine 554a decodes the attribute sub-stream 536 into attribute frames 534a. The attribute frames 534a are similar to the attribute frames 534 of FIG. 5B, with the different being that one or more pixels may have shifted due to the encoding and decoding of the frames resulting in the attribute frames 534a.

The decoding engine 554b decodes the geometry sub-stream 526a into geometry frames 526c. The geometry frames 526c are similar to the geometry frames 526b of FIG. 5B, with the different being that one or more pixels may have shifted due to the encoding and decoding of the frames resulting in the geometry frames 526c.

The decoding engine 554d decodes the occupancy map sub-stream 524a into occupancy map frames 524c. The occupancy map frames 524c are similar to the occupancy map frames 524b of FIG. 5B, with the different being that one or more pixels may have shifted due to the encoding and decoding of the frames resulting in the occupancy map frames 524c.

The decoding engine 554d decodes the patch sub-stream 522 into patch information 522a. The patch information 522a is similar to the patch information prior to being encoded as shown in FIG. 5B.

After the patch information 522d, the occupancy map frames 524c, the geometry frame 526c, and the attribute frames 534a are decoded, the reconstruction engine 556 generates a reconstructed point cloud. The reconstruction engine 556 reconstructs the point cloud. The reconstruction engine 556 is similar to the reconstruction engine 528 of FIG. 5B.

The boundary detection engine 530 identifies the boundary points of the reconstructed point cloud, based on the values of the pixels within the occupancy map frames 524c. The boundary detection engine 530 of the decoder 550 identifies the boundary points of the reconstructed point cloud in a similar manner as the boundary detection engine 530 of the encoder 510 of FIG. 5B.

After the boundary points of the reconstructed point cloud are identified, the geometry smoothing engine 558a applies the geometry smoothing parameters 540a and smooths the identified points of the reconstructed point cloud.

The attribute transfer 560 modifies the attributes of the reconstructed point cloud based on the reconstructed point cloud as modified by the geometry smoothing engine. After the attributes are modified by the attribute transfer 560, the attribute smoothing engine 558b applies the attribute smoothing parameters 540b and smooths the attributes of the reconstructed point cloud. Thereafter, the reconstructed point cloud 564 can be rendered and displayed.

Although FIG. 5A illustrate the environment-architecture 500, FIG. 5B illustrates the encoder 510, and FIG. 5C illustrates the decoder 550, various changes can be made to FIGS. 5A, 5B, 5C, and 4D. For example, any number of encoders or decoders can be included environment-architecture 500.

Figure 6A:
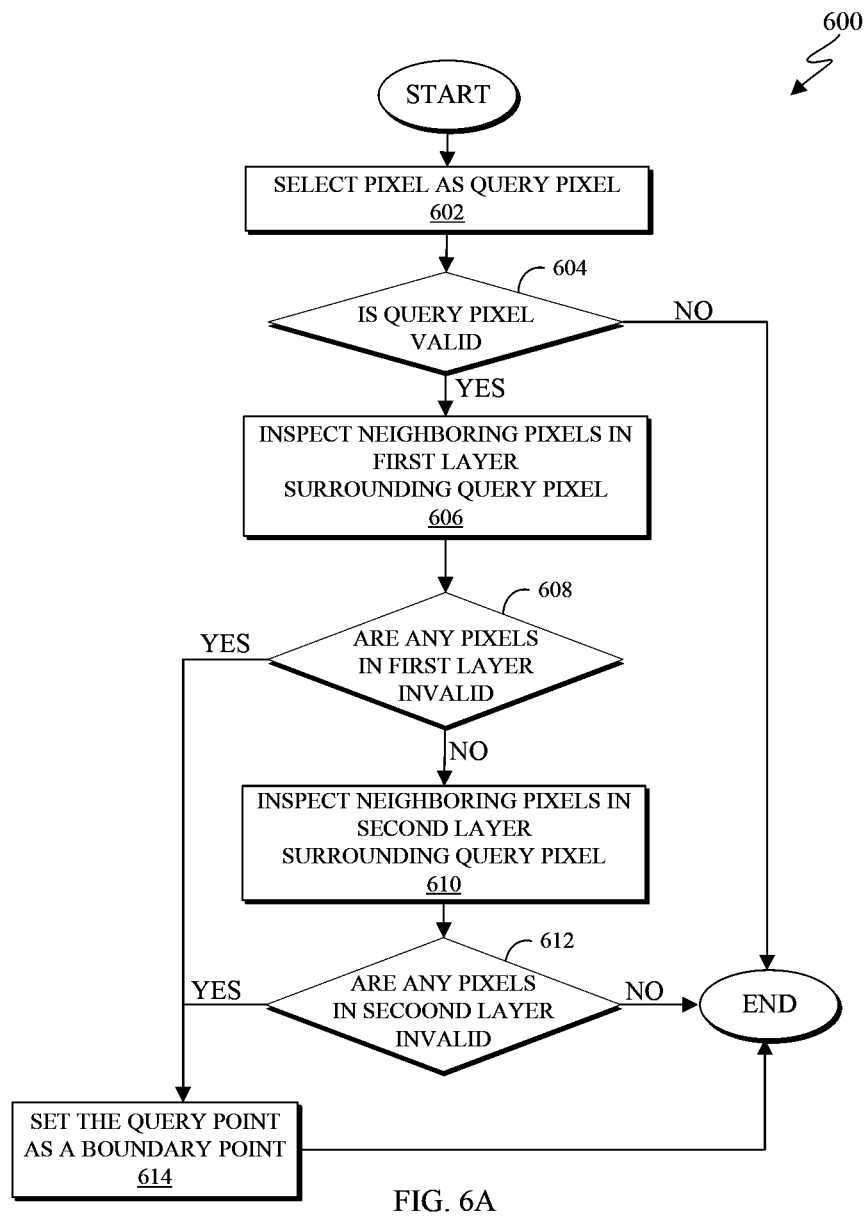
FIG. 6A illustrates an example method for identifying boundary points around a single query pixel in accordance with an embodiment of this disclosure.
Figure 6B:
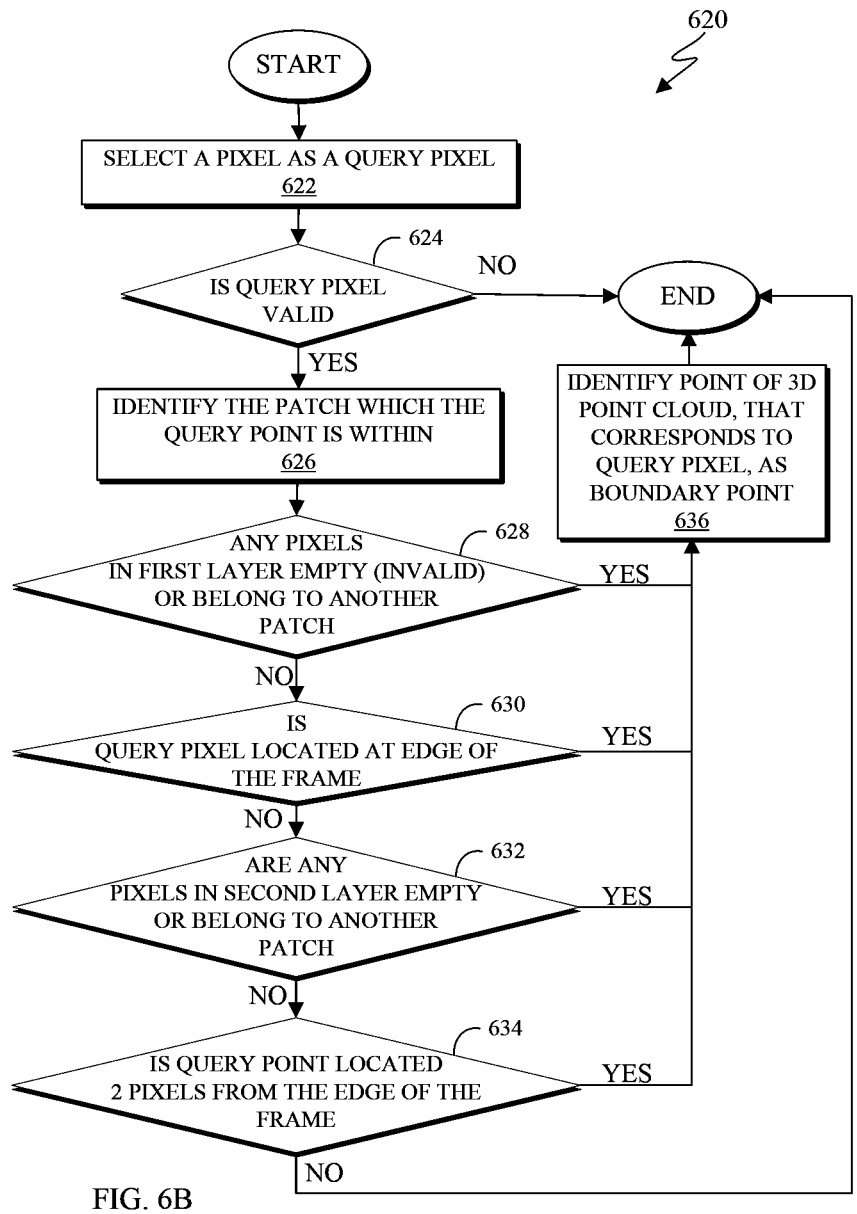
FIG. 6B illustrates an example method for identifying boundary points around a single query pixel in accordance with an embodiment of this disclosure.
Figure 6C:
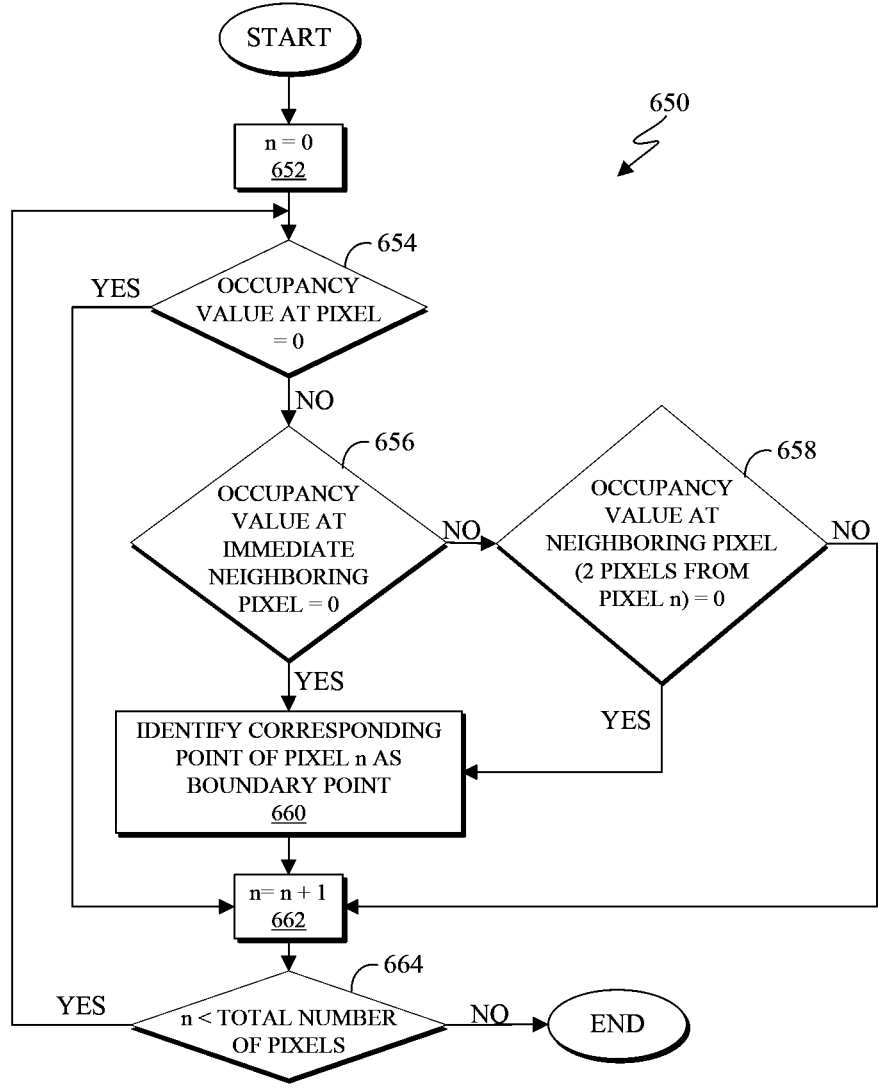
FIG. 6C illustrates an example method for identifying boundary points in accordance with an embodiment of this disclosure.

FIGS. 6A, 6B, and 6C describe the process for identifying boundary points that are positioned within a proximity threshold to a boundary of any of the patches. For example, FIG. 6A illustrates an example method 600 for identifying boundary points around a single query point in accordance with an embodiment of this disclosure. FIG. 6B illustrates an example method 620 for identifying boundary points around a single query point in accordance with an embodiment of this disclosure. FIG. 6C illustrates an example method 650 for identifying boundary points based on the values of the pixels in the occupancy map in accordance with an embodiment of this disclosure. The methods 600, 620, and 650 can be performed by the server 104, any of the client devices 106-116 of FIG. 1, the server 200 of FIG. 2, the electronic device 300 of FIG. 3, the encoder 510 of FIGS. 5A and 5B, the decoder 550 of FIGS. 5A and 5C, or any other suitable device or system. For ease of explanation, the methods 600, 620, and 650 are described as being performed by the boundary detection engine 530 of the encoder 510 and the decoder 550 of FIGS. 5A and 5B.

The method 600, of FIG. 6A, describes the overall process of determining whether a single point of the 3D point cloud that is represented on the 2D frames (such as the geometry frame, the attribute frame, and the occupancy map frame) is a boundary point.

In step 602, the boundary detection engine 530 selects a single pixel from the occupancy map frame as a query pixel. The pixel can be located anywhere within the occupancy map frame. In certain embodiments, the boundary detection engine 530 first selects a certain pixel, such as the pixel denoted by an index number zero. Thereafter, the boundary detection engine 530 will select the next pixel, such as the pixel denoted by an index number one. The process will continue until all of the pixels in the occupancy map or selected or all of the points of the 3D point cloud have been identified as either a boundary point or not a boundary point.

Upon selecting a pixel as the query pixel, in step 604, the boundary detection engine 530 determines whether the query pixel is valid. As discussed above, the occupancy map includes values. In certain embodiments, the values are binary, such as zero or one. For example, when the value of the pixel at location (u, v,) in the occupancy map is a first value (such as zero), indicates that a corresponding pixel at the same location within the geometry frame and attribute frame does not correspond to a point of the 3D point cloud (and considered invalid). When the value of the pixel at location (u, v,) in the occupancy map is a second value (such as one), indicates that a corresponding pixel at the same location within the geometry frame and attribute frame represents information of a point of the 3D point cloud (and considered valid).

Upon determining that the query pixel is zero (representing an invalid pixel), the method 600 ends, since there is no point of the 3D point cloud that corresponds to the pixel in the occupancy map at position (u, v) with a value of zero. It is noted, that upon determining that the query pixel is zero, the boundary detection engine 530 can return to step 602 and select a new pixel within the occupancy map as the query pixel.

Upon determining that the query pixel is one (representing a valid pixel), the boundary detection engine 530 at step 606 inspects the neighboring pixels around the query pixel. The neighboring points are within a first layer of pixels that are adjacent to and surround the query pixel. For example, if the query pixel is not at the edge of the occupancy map frame, the query pixel will have eight neighboring pixels. For example, if the query pixel is positioned at (y, x), the pixels in the first layer are defined as the pixels at (y, x−1), (y, x+1), (y−1, x), (y+1, x), (y−1, x−1), (y−1, x+1), (y+1, x−1), and (y+1, x+1) with respect to the query pixel.

In step 608, the boundary detection engine 530 determines whether any of the pixels within the first layer surrounding the query pixel are invalid (have a value that represents a pixel that does not correspond to the 3D point cloud). If any pixel within the first layer is invalid, indicates that the query pixel is positioned at a boundary of a patch, and therefore the corresponding point of the 3D point cloud would be identified as a boundary point. The query pixel is identified being positioned at a boundary of a patch, since it was previously determined to be valid, and next to a pixel that is considered invalid. As such, since the query pixel is next to an invalid pixel, it is identified as being positioned at a boundary of a patch.

In step 614, if at least one of the pixels within the first layer that surround the query point is invalid (have a value that represents a pixel that does not corresponds to the 3D point cloud), indicates that a pixel in the attribute frame and a corresponding pixel in the in the geometry frame that are at the same location as the query pixel in the occupancy map corresponds to a boundary point of the 3D point cloud. That is, if any of the pixels within the first layer are invalid, then a point of the 3D point cloud that is represented by the pixels in the in the attribute frame and the geometry frame, at the same position as the query pixel, is identified as a boundary pixel.

If all of the pixels within the first layer that surround the query pixel are valid (each pixel has a value that represents a valid pixel in the geometry frame and the attribute frame), then in step 610, the boundary detection engine 530 inspects the second layer of pixels. The second layer of pixels are pixels that are adjacent to and surround the first layer of pixels. For example, if the query pixel is positioned a distance of at least two pixels from the edge of the occupancy map frame, then there are sixteen pixels in the second layer of the query pixel. For example, if the query pixel is positioned at (y, x), the pixels in the second layer are defined as the pixels at (y−2, x−2), (y−2, x−1), (y−2, x), (y−2, x+1), (y−2, x+2), (y−1, x−2), (y−1, x+2), (y, x−2), (y, x+2), (y+1, x−2), (y+1, x+2), (y+2, x−2), (y+1, x−1), (y+1, x), (y+1, x+1), and (y+1, x+2) with respect to the query pixel.

In step 612, the boundary detection engine 530 determines whether any of the pixels within the second layer surrounding the query pixel are invalid (have a value that represents a pixel that does not correspond to the 3D point cloud). If any pixel within the second layer is invalid, indicates that the query pixel is positioned at a boundary of a patch, and therefore the corresponding point of the 3D point cloud would be identified as a boundary point. That is, when one or more pixel that are within the second layer are invalid, indicates that the query pixel is positioned within a proximity threshold to a boundary of any of the patches. In this case the proximity threshold is two pixels from the edge of a patch.

In step 614, if at least one of the pixels within the second layer that surround the query point is invalid (have a value that represents a pixel that does not corresponds to the 3D point cloud), indicates that a pixel in the attribute frame and a pixel in the geometry frame that are at the same location as the query pixel in the occupancy map corresponds to a boundary point of the 3D point cloud. That is, if any of the pixels within the second layer are invalid, then a point of the 3D point cloud that is represented by the pixels in the in the attribute frame and the geometry frame, at the same position as the query pixel, is identified as a boundary pixel.

If all of the pixels within the first layer and the second layer that surround the query pixel are valid (each pixel has a value that represents a valid pixel in the geometry frame and the attribute frame), then, the encoder can select another pixel in the occupancy map frame as the query pixel. When another pixel in the occupancy map frame is selected as the query pixel, the method 600 starts over at step 604.

In certain embodiments, the method 600 can be expanded to include inspect pixels that are beyond the first layer and the second layer. For example, the method 600 can be expanded such that the boundary detection engine 530 inspects the pixels in a third layer through an n-th layer, where each new layer is adjacent to and surrounds the pixels in the layer below it. The more pixels that are inspected the more points of the 3D point cloud are identified as boundary points.

The method 620, of FIG. 6B, is similar to the method 600 of FIG. 6A, as both methods 600 and 620 describe the overall process of determining whether a single point of the 3D point cloud that is represented on the 2D frames (such as the geometry frame, the attribute frame, and the occupancy map frame) is a boundary point. However, the method 620 adds in the ability to identify a point of the 3D point cloud as a boundary point when the pixel in the 2D frames corresponding to that point are near an edge of the frame or when the pixel is near another pixel belonging to another patch.

In step 622 (similar to the step 602 of FIG. 6A), the boundary detection engine 530 selects a single pixel from the occupancy map frame as a query pixel. The pixel can be located anywhere within the occupancy map frame. Thereafter, in step 624 (similar to the step 604 of FIG. 6A), the boundary detection engine 530 determines whether the value of the query pixel indicates a valid pixel. For example, when the value of the pixel at location (u, v,) in the occupancy map is a first value (such as zero), indicates that a corresponding pixel at the same location within the geometry frame and attribute frame does not correspond to a point of the 3D point cloud. When the value of the pixel at location (u, v,) in the occupancy map is a second value (such as one), indicates that a corresponding pixel at the same location within the geometry frame and attribute frame represents information of a point of the 3D point cloud. For example, when the value of a pixel in the occupancy map is zero indicates that the pixels in the geometry and attribute frames, at the same location, are invalid. When the value of a pixel in the occupancy map is one indicates that the pixels in the geometry and attribute frames, at the same location, are valid and thereby represent to a particular point of the 3D point cloud.

Upon determining that the value of the query pixel is zero (representing an invalid pixel), the method 600 ends, since there is no point of the 3D point cloud that corresponds to a pixel in the attribute frame and the geometry frame at position (u, v), since the value of the pixel at that location, in the occupancy map, is zero. In certain embodiments, that upon determining that the value of the query pixel is zero, the boundary detection engine 530 can return to step 622 and select a new pixel within the occupancy map as the query pixel.

In step 626, upon determining that the value of the query pixel is one (representing a valid pixel), the boundary detection engine 530 identifies a patch to which the pixel belongs. For example, as described in FIGS. 4C and 4D, multiple patches, such as the patches 432 and 442 are included in a single frame. Since each patch can be identified by a patch index number, the boundary detection engine 530 can identify which patch the pixel is within. For example, the query pixel can be within a patch identified by an index number between one and the total number of patches (or if the patches start at index number zero, between index number zero and the total number of patches minus one).

In step 628 the boundary detection engine 530 determines whether any pixels in the first layer around the query pixel are invalid (similar to the step 606 and 608 of FIG. 6A) or whether the any of the pixels in the first layer around the query pixel belong to a different patch. The neighboring points in the first layer are within a first layer of pixels that are adjacent to and surround the query pixel. For example, if the query pixel is not at the edge of the occupancy map frame, the query pixel will have eight neighboring pixels, such as the pixels at (y, x−1), (y, x+1), (y−1, x), (y+1, x), (y−1, x−1), (y−1, x+1), (y+1, x−1), and (y+1, x+1).

The boundary detection engine 530 at step 628 inspects the neighboring pixels around the query pixel, to identify whether the value of the query pixel in the occupancy map indicates a valid or invalid pixel as well as the patch to which each pixel in the first layer belongs.

If at least one of the pixels within the first layer that surround the query point is invalid (have a value that represents a pixel that does not corresponds to the 3D point cloud), then in step 636, the boundary detection engine 530 identifies a pixel in the attribute frame and a corresponding pixel in the in the geometry frame that are at the same location as the query pixel in the occupancy map corresponds as a boundary point of the 3D point cloud. That is, if any of the pixels within the first layer are invalid, then a point of the 3D point cloud that is represented by the pixels in the in the attribute frame and the geometry frame, at the same position as the query pixel, is identified as a boundary point.

Similarly, if at least one of the pixels within the first layer that surround the query point belong to a different patch than that of the query point, then in step 636, the boundary detection engine 530 identifies a pixel in the attribute frame and a corresponding pixel in the in the geometry frame that are at the same location as the query pixel in the occupancy map corresponds as a boundary point of the 3D point cloud. For example, the boundary detection engine 530 compares the patch index number of the query pixel to the patch index number of each of the neighboring pixels in the first layer. When any of the pixels in the first layer belong to a different patch, the boundary detection engine 530 identifies a point of the 3D point cloud that corresponds to the query pixel (based on a pixel that is at the same location in the geometry frame and attribute frame as the query pixel in the occupancy map frame) as a boundary point.

When all of the pixels in the first layer belong to the same patch and all of the pixels in the first layer are valid, the boundary detection engine 530, in step 630, determines whether the query pixel is located at the edge of the occupancy map frame. For example, the boundary detection engine 530 determines whether any of the pixels in the first layer do not exist. A pixel in the first layer will not exist if the query pixel is positioned on the boundary of the occupancy map frame.

Upon determining that the query pixel is located at along the boundary of the occupancy map frame, then in step 636, the boundary detection engine 530 identifies a pixel in the attribute frame and a corresponding pixel in the in the geometry frame that are at the same location as the query pixel in the occupancy map corresponds as a boundary point of the 3D point cloud. That is, if any of the pixels within the first layer do not exist (such as when the query pixel is located on the boundary of the occupancy map frame), then a point of the 3D point cloud that is represented by the pixels in the in the attribute frame and the geometry frame, at the same position as the query pixel, is identified as a boundary point.

When all of the pixels in the first layer are present, the boundary detection engine 530 at step 632, determines whether any pixels in the second layer around the query pixel are invalid (similar to the step 610 and 612 of FIG. 6A) or whether the any of the pixels in the second layer around the query pixel belong to a different patch. The second layer of pixels are pixels that are adjacent to and surround the first layer of pixels For example, if the query pixel is positioned a distance of at least two pixels from the edge of the occupancy map frame, then there are sixteen pixels in the second layer of the query pixel, such as the pixels at (y−2, x−2), (y−2, x−1), (y−2, x), (y−2, x+1), (y−2, x+2), (y−1, x−2), (y−1, x+2), (y, x−2), (y, x+2), (y+1, x−2), (y+1, x+2), (y+2, x−2), (y+1, x−1), (y+1, x), (y+1, x+1), and (y+1, x+2).

The boundary detection engine 530 at step 632 inspects the neighboring pixels at a second layer around the query pixel, to identify whether the value of the query pixel in the occupancy map indicates a valid or invalid pixel as well as the patch to which each pixel in the first layer belongs.

If at least one of the pixels within the second layer that surround the query point is invalid (have a value that represents a pixel that does not corresponds to the 3D point cloud), then in step 636, the boundary detection engine 530 identifies a pixel in the attribute frame and a corresponding pixel in the in the geometry frame that are at the same location as the query pixel in the occupancy map corresponds as a boundary point of the 3D point cloud. That is, if any of the pixels within the second layer are invalid, then a point of the 3D point cloud that is represented by the pixels in the in the attribute frame and the geometry frame, at the same position as the query pixel, is identified as a boundary point.

Similarly, if at least one of the pixels within the second layer that surround the query point belong to a different patch than that of the query point, then in step 636, the boundary detection engine 530 identifies a pixel in the attribute frame and a corresponding pixel in the in the geometry frame that are at the same location as the query pixel in the occupancy map corresponds as a boundary point of the 3D point cloud. For example, the boundary detection engine 530 compares the patch index number of the query pixel to the patch index number of each of the neighboring pixels in the second layer. When any of the pixels in the second layer belong to a different patch, the boundary detection engine 530 identifies a point of the 3D point cloud that corresponds to the query pixel (based on a pixel that is at the same location in the geometry frame and attribute frame as the query pixel in the occupancy map frame) as a boundary point.

When all of the pixels in the second layer belong to the same patch as the query pixel and all of the pixels in the second layer are valid, the boundary detection engine 530, in step 634, determines whether the query pixel is located 2 pixels away from the edge of the occupancy map frame. For example, the boundary detection engine 530 determines whether any of the pixels in the second layer do not exist. A pixel in the second layer will not exist if the query pixel is located 2 pixels away from the edge of the occupancy map frame.

Upon determining that the query pixel is located at along the boundary of the occupancy map frame, then in step 636, the boundary detection engine 530 identifies a pixel in the attribute frame and a corresponding pixel in the in the geometry frame that are at the same location as the query pixel in the occupancy map corresponds as a boundary point of the 3D point cloud. That is, if any of the pixels within the second layer do not exist (such as when the query pixel is located a distance of 2 pixels away from the boundary of the occupancy map frame), then a point of the 3D point cloud that is represented by the pixels in the in the attribute frame and the geometry frame, at the same position as the query pixel, is identified as a boundary point.

If all of the pixels in the first layer are present, then the boundary detection engine 530 determines that the query pixel is not located 2 pixels from the edge of the frame. When the query pixel is not located 2 pixels from the edge of the frame, the method 620 ends. In certain embodiments, the boundary detection engine 530 can select another pixel in the occupancy map frame as the query pixel. When another pixel in the occupancy map frame is selected as the query pixel, the method 600 returns to step 624 and determines whether the new query pixel is valid. In certain embodiments, the method 620 can be expanded to include inspect pixels that are beyond the first layer and the second layer. For example, the method 620 can be expanded such that the boundary detection engine 530 inspects the pixels in a third layer through an n-th layer, where each new layer is adjacent to and surrounds the pixels in the layer below it. The more pixels that are inspected the more points of the 3D point cloud are identified as boundary points.

The method 650, of FIG. 6C, describes the overall process for identifying which points of a 3D point cloud correspond to pixels that are positioned within the proximity threshold to a boundary of any of the patches within the frames. That is, the method 650 is used to identify the boundary points within a point cloud based on the value of the pixels within the occupancy map frame. The method 650 is limited to identifying boundary points, of the 3D point cloud, that correspond to pixels which are a distance of two pixels between the query pixel and boundary of a patch. In certain embodiments, the method 650 can be expanded to include identifying boundary points that correspond to pixels that are a distance greater than two pixels between the query pixel and boundary of a patch.

In step 652, the boundary detection engine 530 sets the variable n to zero. The variable n is used as a counter to identify a pixel of the occupancy map.

In step 654, the boundary detection engine 530 determines whether the occupancy value of the pixel n in the occupancy map is zero. A zero value of a pixel in the occupancy map indicates that there is no corresponding point in the 3D point cloud, while a non-zero value (such as one in the occupancy map indicates that there is a corresponding point in the 3D point cloud, based on the information within the geometry frame and the occupancy map frame). If the value of the pixel of the pixel n is zero, then in step 662 the boundary detection engine 530 increases the value of n by one corresponding to a new pixel within the occupancy map.

When the value of the pixel is a non-zero value then the boundary detection engine 530 in step 656 identifies values of the pixels immediately neighboring the pixel n. The boundary detection engine 530 then determines whether any of the values of the pixels immediately neighboring the pixel n (such as the pixels within the first layer) are equal zero.

If in step 656, the boundary detection engine 530 determines that one or more values of the pixels which immediately neighbor pixel n (the pixels within the first layer) are equal zero, then in step 660 the boundary detection engine 530 identifies a point of the 3D point cloud that corresponds to pixel n (based on the geometry frame) as a boundary point. Alternatively, if in step 656, the boundary detection engine 530 determines that none of the pixels which immediately neighbor pixel n (the pixels within the first layer) have a value of equal zero, then in step 658 the boundary detection engine 530 identifies values of the pixels which are two pixels away from the pixel n (second layer). The boundary detection engine 530 then determines whether any of the values of the pixels that are two pixels away from the neighboring the pixel n (such as the pixels within the second layer) are equal zero.

If in step 658, the boundary detection engine 530 determines that one or more values of the pixels which are two pixels away from pixel n (the pixels within the second layer) are equal zero, then in step 660 the boundary detection engine 530 identifies a point of the 3D point cloud that corresponds to pixel n (based on the geometry frame) as a boundary point. Alternatively, if in step 658, the boundary detection engine 530 determines that none of the pixels which that are two pixels away from pixel n (the pixels within the second layer) have a value of equal zero, then in step 662 the boundary detection engine 530 increases the value of n by one corresponding to a new pixel within the occupancy map.

Additionally, after the boundary detection engine 530 identifies a point of the 3D point cloud that corresponds to pixel n (based on the geometry frame) as a boundary point, in step 660, the boundary detection engine 530 increases the value of n by one corresponding to a new pixel within the occupancy map.

In step 664, the boundary detection engine 530 compares the value of n to the total number of pixels in the occupancy map frame. When the value of n is less than the total number of pixels in the occupancy map frame, then the boundary detection engine 530 returns to step 654 and determines whether the new pixel n (based on the increased value of n of step 662) is equal to zero. When the value of n is equal to or greater than the total number of pixels, then the method 650 ends as the boundary detection engine 530 has identified all of the boundary points of the 3D point cloud.

In certain embodiments, the method 650 can be expanded to include pixels more than 2 pixels away from the pixel n. For example, the boundary detection engine 530 can identify the values of the pixels which are three or more pixels away from the pixel n and subsequently determine whether any of the values of those pixels (pixels which are three or more pixels away from the pixel n) are equal zero.

In certain embodiments, instead of n corresponding to a pixel in the occupancy map, as described above, n can correspond to a point or the 3D point cloud. When n corresponds to a point of the 3D point cloud, the method 650 stops when all the points are inspected. This uses less processing as only the points of the point cloud are inspected instead of every pixel in the occupancy map frame, since the occupancy map frame includes both valid and invalid pixels.

Although FIGS. 6A, 6B, and 6C illustrate examples identifying boundary points, various changes can be made to FIGS. 6A, 6B, and 6C. For example, while shown as a series of steps, various steps in FIGS. 6A, 6B, and 6C could overlap, occur in parallel, or occur any number of times. In another example, the boundary detection engine 530 can identify boundary points using other methods.

Figure 7B:
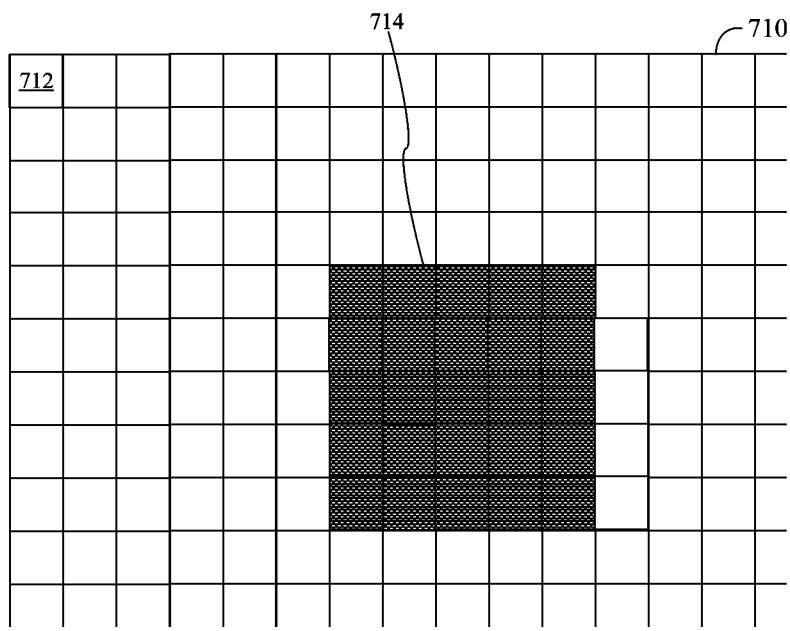
FIG. 7B illustrates an example portion of an occupancy map that includes patch in accordance with an embodiment of this disclosure.

FIGS. 7A-7M illustrate diagrams for identifying boundary points that are positioned within a proximity threshold to a boundary of any of the patches. FIG. 7A illustrates an example sliding window for identifying boundary points in accordance with an embodiment of this disclosure. FIG. 7B illustrates an example portion of an occupancy map that includes patch in accordance with an embodiment of this disclosure. FIGS. 7C-7L illustrate an example process of identifying the boundary points by moving the sliding window through an occupancy map to identify boundary points in accordance with an embodiment of this disclosure. FIG. 7M illustrates the example occupancy map frame that indicates which pixels correspond to correspond to boundary points of the 3D point cloud. The process of identifying the boundary points can be performed by the server 104, any of the client devices 106-116 of FIG. 1, the server 200 of FIG. 2, the electronic device 300 of FIG. 3, the encoder 510 of FIGS. 5A and 5B, the decoder 550 of FIGS. 5A and 5C, or any other suitable device or system. For ease of explanation, the process of identifying boundary points as shown in FIGS. 7A-7M are described as being performed by the boundary detection engine 530 of the encoder 510 and the decoder 550 of FIGS. 5A and 5B.

FIG. 7A illustrates an example sliding window 700. The sliding window 700 includes a query pixel 702 at its center. The sliding window 700 also includes a first layer of pixels that are adjacent to and surround the query pixel 702. The first layer of pixels includes pixel 704a, pixel 704b, pixel 704c, pixel 704d, pixel 704e, pixel 704f, pixel 704g, and pixel 704h (collectively pixels 704). The first layer are pixels are the pixels include the pixels that are the closest to the query pixel 702.

The sliding window 700 also includes a second layer of pixels that are adjacent to and surround the first layer of pixels 704 which are two pixels away from the query pixel 702. The second layer of pixels include pixel 706a, pixel 706b, pixel 706c, pixel 706d, pixel 706e, pixel 706f, pixel 706g, pixel 706h, pixel 706i, pixel 706j, pixel 706k, pixel 706l, pixel 706m, pixel 706n, pixel 706o, pixel 706p. (collectively the second layer of pixels 706). The second layer are pixels are the pixels include the pixels that are within two-pixel distance to the query pixel 702.

In certain embodiments, additional layers can be included that surround the query pixel. The sliding window 700 is able to identify pixels that are distance from the query pixel. The distance can be referred to as a proximity threshold since the distance can include two or more layers of pixels.

FIG. 7B illustrates a portion of an occupancy map frame 710. The portion of the occupancy map frame 710 is similar to one of the occupancy map frames 516, of FIG. 5B, and includes multiple pixels such as pixel 712. The pixels 712 include both valid and invalid pixels based on the value associated with each individual pixel. As illustrated in FIG. 7B, an invalid pixel (a pixel with a value of zero) is denoted with no shading, while a valid pixel (a pixel with a non-zero value, such as one) is denoted with shading. The portion of the occupancy map frame 710 includes a patch 714. The patch 714 includes twenty-five valid pixels.

The boundary detection engine 530 of FIGS. 5B and 5C performs boundary detection of patches in the portion of the occupancy map frame 710. For example, the boundary detection engine 530 identifies a boundary between a valid pixel and an invalid pixel. In another example, the boundary detection engine 530 identifies a boundary between an invalid pixel and a valid pixel that is within a threshold distance stance the query pixel. point. The boundary detection engine 530 performs a single pass over an occupancy map frame to identify pixels that are within proximity threshold to a boundary of any of the patches.

FIG. 7C illustrates the sliding window 700 at a location of the occupancy map frame 710. The boundary detection engine 530 determines whether the query pixel 702 of the sliding window 700 is positioned over a valid or invalid pixel of the occupancy map frame 710. Upon determining that the query pixel 702 corresponds to an invalid pixel in the occupancy map frame 710, the boundary detection engine 530 identifies that pixel (the pixel of the occupancy map frame 710) as corresponding to a non-boundary point as shown in the identified boundary points 720a.

FIG. 7D illustrates the sliding window 700 at a new location of the occupancy map frame 710. That is, the sliding window 700 moved one pixel to the right as compared to the FIG. 7C. The boundary detection engine 530 determines whether the query pixel 702 of the sliding window 700 is positioned over a valid or invalid pixel of the occupancy map frame 710. Upon determining that the query pixel 702 corresponds to an invalid pixel in the occupancy map frame 710, the boundary detection engine 530 identifies that pixel (the pixel of the occupancy map frame 710) as corresponding to a non-boundary point as shown in the identified boundary points 720b.

FIG. 7E illustrates the sliding window 700 at a new location of the occupancy map frame 710. That is, the sliding window 700 moved one pixel to the right as compared to the FIG. 7D. The boundary detection engine 530 determines whether the query pixel 702 of the sliding window 700 is positioned over a valid or invalid pixel of the occupancy map frame 710. Upon determining that the query pixel 702 corresponds to an invalid pixel in the occupancy map frame 710, the boundary detection engine 530 identifies that pixel (the pixel of the occupancy map frame 710) as corresponding to a non-boundary point as shown in the identified boundary points 720c.

FIG. 7F illustrates the sliding window 700 at a new location of the occupancy map frame 710. That is, the sliding window 700 moved one pixel to the right as compared to the FIG. 7E. The boundary detection engine 530 determines whether the query pixel 702 of the sliding window 700 is positioned over a valid or invalid pixel of the occupancy map frame 710. Upon determining that the query pixel 702 corresponds to an invalid pixel in the occupancy map frame 710, the boundary detection engine 530 identifies that pixel (the pixel of the occupancy map frame 710) as corresponding to a non-boundary point as shown in the identified boundary points 720d.

Figure 7G:
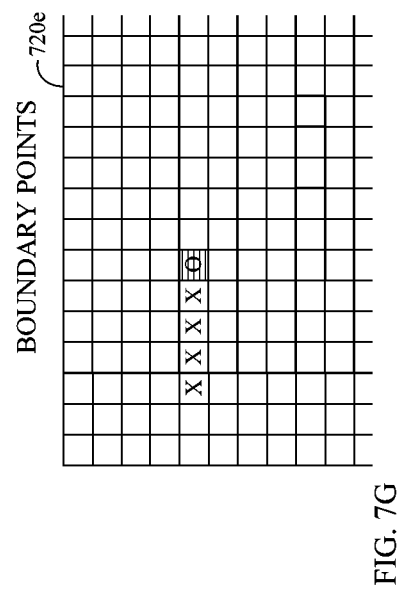
Figure 7G:
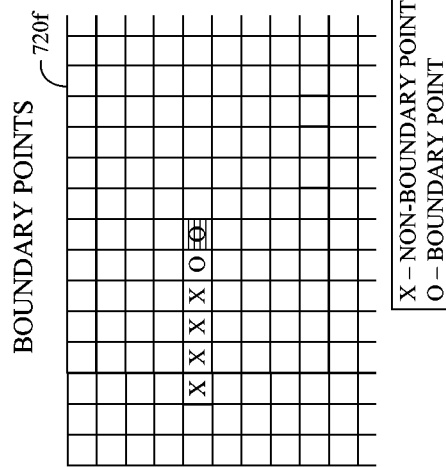

FIG. 7G illustrates the sliding window 700 at a new location of the occupancy map frame 710. That is, the sliding window 700 moved one pixel to the right as compared to the FIG. 7F. The boundary detection engine 530 determines whether the query pixel 702 of the sliding window 700 is positioned over a valid or invalid pixel of the occupancy map frame 710. Upon determining that the query pixel 702 corresponds to a valid pixel in the occupancy map frame 710, the boundary detection engine 530 determines whether any pixels within the first layer of pixels 704 are invalid (correspond to a pixel in the occupancy map frame 710 that has a value of zero). As shown in FIG. 7G, five pixels within the first layer of pixels 704 of the sliding window 700 are positioned over invalid pixels while three pixels are positioned over valid pixels. Since at least one of the pixels in within the first layer of pixels 704 of the sliding window 700 are positioned over an invalid pixel, the boundary detection engine 530 identifies that pixel (the pixel of the occupancy map frame 710 indicated by the query pixel 702) as corresponding to a boundary point as shown in the identified boundary points 720e.

Figure 7H:
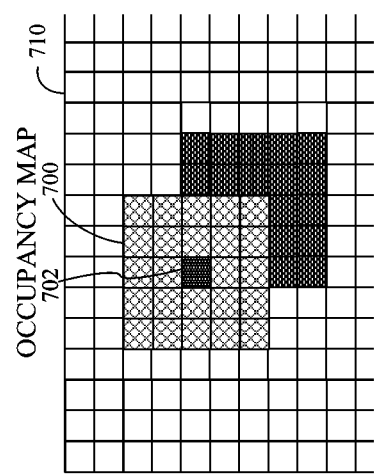
Figure 7H:
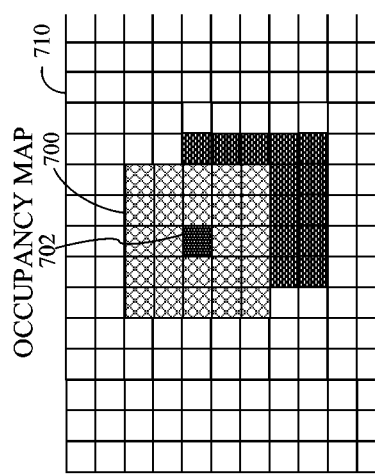
Figure 7M:
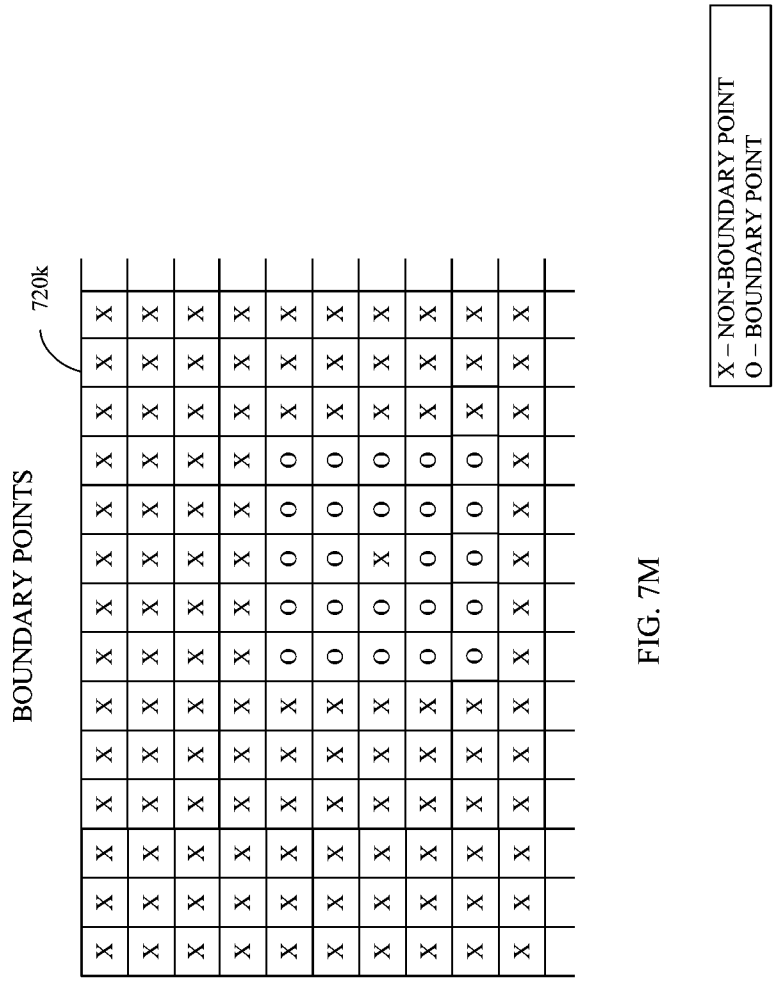

FIG. 7H illustrates the sliding window 700 at a new location of the occupancy map frame 710. That is, the sliding window 700 moved one pixel to the right as compared to the FIG. 7G. The boundary detection engine 530 determines whether the query pixel 702 of the sliding window 700 is positioned over a valid or invalid pixel of the occupancy map frame 710. Upon determining that the query pixel 702 corresponds to a valid pixel in the occupancy map frame 710, the boundary detection engine 530 determines whether any pixels within the first layer of pixels 704 are invalid (correspond to a pixel in the occupancy map frame 710 that has a value of zero). As shown in FIG. 7H, five pixels within the first layer of pixels 704 of the sliding window 700 are positioned over invalid pixels while three pixels are positioned over valid pixels. Since at least one of the pixels in within the first layer of pixels 704 of the sliding window 700 are positioned over an invalid pixel, the boundary detection engine 530 identifies that pixel (the pixel of the occupancy map frame 710 indicated by the query pixel 702) as corresponding to a boundary point as shown in the identified boundary points 720f.

FIG. 7I illustrates the sliding window 700 at a new location of the occupancy map frame 710. That is, the sliding window 700 moved one pixel to the right as compared to the FIG. 7H. The boundary detection engine 530 determines whether the query pixel 702 of the sliding window 700 is positioned over a valid or invalid pixel of the occupancy map frame 710. Upon determining that the query pixel 702 corresponds to a valid pixel in the occupancy map frame 710, the boundary detection engine 530 determines whether any pixels within the first layer of pixels 704 are invalid (correspond to a pixel in the occupancy map frame 710 that has a value of zero). As shown in FIG. 7I, five pixels within the first layer of pixels 704 of the sliding window 700 are positioned over invalid pixels while three pixels are positioned over valid pixels. Since at least one of the pixels in within the first layer of pixels 704 of the sliding window 700 are positioned over an invalid pixel, the boundary detection engine 530 identifies that pixel (the pixel of the occupancy map frame 710 indicated by the query pixel 702) as corresponding to a boundary point as shown in the identified boundary points 720g.

FIG. 7J illustrates the sliding window 700 at a new location of the occupancy map frame 710. That is, the sliding window 700 moved one pixel to the right as compared to the FIG. 7I. The boundary detection engine 530 determines whether the query pixel 702 of the sliding window 700 is positioned over a valid or invalid pixel of the occupancy map frame 710. Upon determining that the query pixel 702 corresponds to a valid pixel in the occupancy map frame 710, the boundary detection engine 530 determines whether any pixels within the first layer of pixels 704 are invalid (correspond to a pixel in the occupancy map frame 710 that has a value of zero). As shown in FIG. 7J, five pixels within the first layer of pixels 704 of the sliding window 700 are positioned over invalid pixels while three pixels are positioned over valid pixels. Since at least one of the pixels in within the first layer of pixels 704 of the sliding window 700 are positioned over an invalid pixel, the boundary detection engine 530 identifies that pixel (the pixel of the occupancy map frame 710 indicated by the query pixel 702) as corresponding to a boundary point as shown in the identified boundary points 720*h*.

FIG. 7K illustrates the sliding window 700 at a new location of the occupancy map frame 710. That is, the sliding window 700 moved one pixel to the right as compared to the FIG. 7J. The boundary detection engine 530 determines whether the query pixel 702 of the sliding window 700 is positioned over a valid or invalid pixel of the occupancy map frame 710. Upon determining that the query pixel 702 corresponds to a valid pixel in the occupancy map frame 710, the boundary detection engine 530 determines whether any pixels within the first layer of pixels 704 are invalid (correspond to a pixel in the occupancy map frame 710 that has a value of zero). As shown in FIG. 7I, five pixels within the first layer of pixels 704 of the sliding window 700 are positioned over invalid pixels while three pixels are positioned over valid pixels. Since at least one of the pixels in within the first layer of pixels 704 of the sliding window 700 are positioned over an invalid pixel, the boundary detection engine 530 identifies that pixel (the pixel of the occupancy map frame 710 indicated by the query pixel 702) as corresponding to a boundary point as shown in the identified boundary points 720*g*.

FIG. 7L illustrates the sliding window 700 at a new location of the occupancy map frame 710. That is, the sliding window 700 moved one pixel to the right as compared to the FIG. 7K. The boundary detection engine 530 determines whether the query pixel 702 of the sliding window 700 is positioned over a valid or invalid pixel of the occupancy map frame 710. Upon determining that the query pixel 702 corresponds to an invalid pixel in the occupancy map frame 710, the boundary detection engine 530 identifies that pixel (the pixel of the occupancy map frame 710) as corresponding to a non-boundary point as shown in the identified boundary points 720*b*.

It is noted, that if the boundary detection engine 530 determined that all of the pixels within the first layer of pixels 704 of the sliding window 700 are positioned over valid pixels, then the boundary detection engine 530 would inspect the pixels of the second layer of pixels 706. If any of the pixels in the second layer of pixels 706 were positioned over an invalid pixel, then the boundary detection engine 530 would determine that pixel (the pixel of the occupancy map frame 710 indicated by the query pixel 702) as corresponding to a boundary point. Alternatively, if all of the pixels in the second layer of pixels 706 were positioned over valid pixels, then the boundary detection engine 530 would identify that pixel (the pixel of the occupancy map frame 710 indicated by the query pixel 702) as corresponding to a non-boundary point.

After determining that pixel (the pixel of the occupancy map frame 710 indicated by the query pixel 702) as corresponding to a boundary point, or after determining that that pixel (the pixel of the occupancy map frame 710 indicated by the query pixel 702) as corresponding to a non-boundary point, the sliding window would move over another pixel in the occupancy map. In certain embodiments, the sliding window 700 moves horizontally from one pixel in a row to another pixel, and upon reaching the end of a row and then moves vertically one pixel to a new row and continues moving horizontally down the new row, until each pixel is inspected. In certain embodiments, the sliding window 700 moves in a predefined pattern over the pixels in the occupancy map frame.

FIG. 7M illustrates the boundary points 720*k*. FIG. 7M illustrates a mapping that indicates which pixels of the occupancy map frame 710 correspond to boundary points of the 3D point cloud, based on the patch 714 as identified by the sliding window 700 and the boundary detection engine 530.

Although FIGS. 7A-7M illustrate one example of identifying boundary points, various changes can be made to FIGS. 7A-7M. For example, the sliding window can include more or less layers. For another example, any number of pixels can be included in the portion of the occupancy map frame 710, and any of the pixels can be valid or invalid points on the frame.

Figure 8:
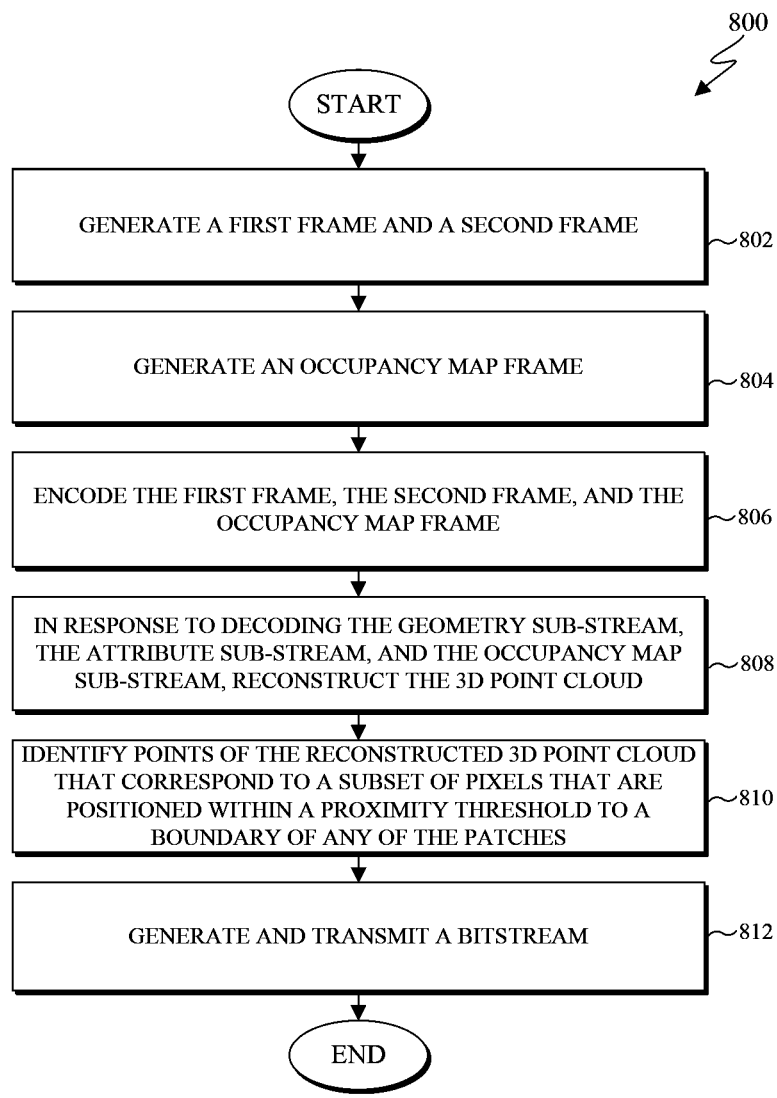
FIG. 8 illustrates example method for decoding a point cloud in accordance with an embodiment of this disclosure.

FIG. 8 illustrates example method 800 for encoding a point cloud in accordance with an embodiment of this disclosure. The method 800 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 800 is described as being performed by the encoder 510 of FIGS. 5A and 5B.

In step 802, the encoder 510 generates for a 3D point cloud, a geometry frame. The geometry frame includes pixels. A portion of the pixels included in the geometry frame represent geometric locations of points of the 3D point cloud that are organized into patches corresponding to respective clusters of the points of the 3D point cloud. Additionally, the encoder 510 generates an attribute frame. The attribute frame includes pixels and a portion of the pixels of the attribute frame represent attribute information of points of the 3D point cloud. The positions of the pixels in the second frame correspond to respective positions of the pixels in the first frame.

In step 804, the encoder 510 generates an occupancy map frame. The occupancy map frame includes pixels that identify the portion of the pixels in the geometry frame that represent the geometric locations of the points of the 3D point cloud. The pixels of the occupancy map frame also identify the positions of the pixels in the attribute frame that represent the attribute information of the points of the 3D point cloud.

In step 806, the encoder 510 encodes the geometry frame to generate a geometry sub-stream, the attribute frame to generate an attribute sub-stream, and the occupancy map frame to generate an occupancy map sub-stream. In response to decoding the geometry sub-stream, the attribute sub-stream, and the occupancy map sub-stream, the encoder 510 reconstruct the 3D point cloud using the geometry frame and the occupancy map frame (step 808).

In step 810, the encoder 510 performs a single pass of the occupancy map frame to identify points of the reconstructed 3D point cloud that correspond to a subset of pixels in the geometry frame and the attribute frame that are positioned within a proximity threshold to a boundary of any of the patches. The encoder 510 identifies the points of the reconstructed 3D point cloud that correspond to a subset of pixels, based on a value of the pixels within the occupancy map frame.

For example, the encoder 510 selects a query pixel in the occupancy map frame and upon determining that the query pixel corresponds to a valid pixel in the geometry frame, the encoder 510 inspects the neighboring pixels of the query pixel. The encoder 510 first inspects pixels within a first layer around the query pixel. With respect to the first layer, the encoder 510 identifies whether (i) any of the pixels in the first layer are invalid, (ii) any of the pixels in the first layer belong to a patch that is different than the query pixel, or (iii) any of the pixels in the first layer are located at the edge of the frame, then the point of the point cloud that corresponds to the query pixel is identified as a boundary point. If (i) all of the pixels in the first layer are valid, (ii) all of the pixels in the first layer belong to a patch that is different than the query pixel, or (iii) none of the pixels in the first layer are located at the edge of the frame, then the encoder 510 inspects pixels within a second layer around the query pixel.

With respect to the second layer, the encoder 510 identifies whether (i) any of the pixels in the second layer are invalid, (ii) any of the pixels in the second layer belong to a patch that is different than the query pixel, or (iii) any of the pixels in the second layer are located at the edge of the frame, then the point of the point cloud that corresponds to the query pixel is identified as a boundary point. If (i) all of the pixels in the second layer are valid, (ii) all of the pixels in the second layer belong to a patch that is different than the query pixel, or (iii) none of the pixels in the second layer are located at the edge of the frame, then the encoder 510 selects a new query pixel.

In certain embodiments, the decoder 550 can then perform a smoothing to the identified boundary points and generate smoothing parameters. The decoder 550 can apply the smoothing parameters in order to increase the visual quality of the reconstructed point cloud by removing any possible artifacts.

After the frames representing 3D point cloud are encoded, and the boundary points are identified, the encoder 510 can multiplex the frames into a bitstream. In step 812, the encoder 510 transmits the bitstream. The bitstream can be ultimately transmitted to a decoder, such as the decoder 550.

Although FIG. 8 illustrates one example of a method 800 for encoding a point cloud, various changes may be made to FIG. 8. For example, while shown as a series of steps, various steps in FIG. 8 could overlap, occur in parallel, or occur any number of times.

Figure 9:
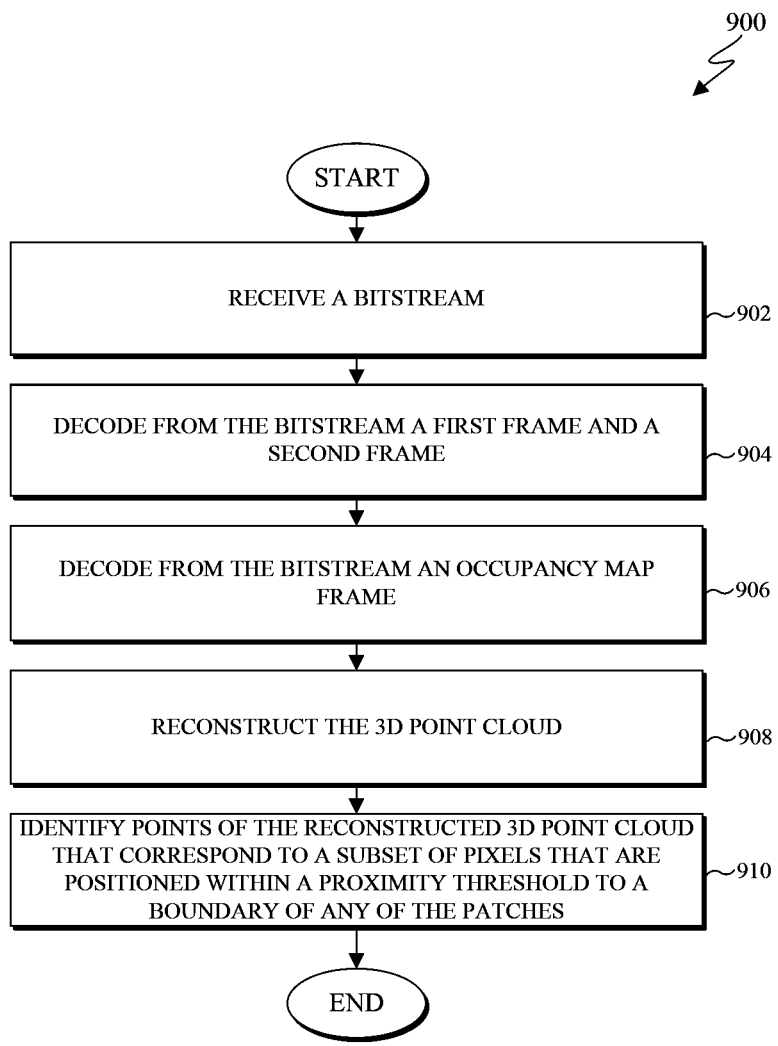
FIG. 9 illustrates example method for encoding a point cloud in accordance with an embodiment of this disclosure

FIG. 9 illustrates example method 900 for decoding a point cloud in accordance with an embodiment of this disclosure. The method 900 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 900 is described as being performed by the decoder 550 of FIGS. 5A and 5C.

The method 900 begins with the decoder, such as decoder 550, receiving a compressed bitstream (step 902). The received bitstream can include an encoded point cloud that was mapped onto multiple 2-D frames, compressed, and then transmitted and ultimately received by the decoder 550.

In step 904, the decoder 550 decodes a geometry frame and an attribute frame from the bitstream. The geometry frame includes pixels and a portion of the pixels of the geometry frame represent geometric locations of points of the 3D point cloud. The pixels of the geometry frame that are organized into patches corresponding to respective clusters of the points of the 3D point cloud. The attribute frame includes pixels and a portion of the pixels of the attribute frame represent attribute information of the points of the 3D point cloud, and a position of the pixels in the attribute frame correspond to a respective position of the pixels in the geometry frame.

In step 906, the decoder 550 decodes an occupancy map frame from the bit stream. The occupancy map frame includes pixels that identify the portion of the pixels in the geometry frame that represent the geometric locations of the points of the 3D point cloud. The pixels of the occupancy map frame also identify the portion of the pixels in the attribute frame that represent the attribute information of the points of the 3D point cloud.

In step 908, the decoder 550 reconstructs the 3D point cloud using the geometry frame, the attribute frame, and the occupancy map frame.

In step 910, the decoder 550 performs a single pass of the occupancy map frame to identify points of the reconstructed 3D point cloud that correspond to a subset of pixels in the geometry frame that are positioned within a proximity threshold to a boundary of any of the patches. The encoder 510 identifies the points of the reconstructed 3D point cloud that correspond to a subset of pixels, based on a value of the pixels within the occupancy map frame.

For example, the encoder 510 selects a query pixel in the occupancy map frame and upon determining that the query pixel corresponds to a valid pixel in the geometry frame, the encoder 510 inspects the neighboring pixels of the query pixel. The encoder 510 first inspects pixels within a first layer around the query pixel. With respect to the first layer, the encoder 510 identifies whether (i) any of the pixels in the first layer are invalid, (ii) any of the pixels in the first layer belong to a patch that is different than the query pixel, or (iii) any of the pixels in the first layer are located at the edge of the frame, then the point of the point cloud that corresponds to the query pixel is identified as a boundary point. If (i) all of the pixels in the first layer are valid, (ii) all of the pixels in the first layer belong to a patch that is different than the query pixel, or (iii) none of the pixels in the first layer are located at the edge of the frame, then the encoder 510 inspects pixels within a second layer around the query pixel.

With respect to the second layer, the encoder 510 identifies whether (i) any of the pixels in the second layer are invalid, (ii) any of the pixels in the second layer belong to a patch that is different than the query pixel, or (iii) any of the pixels in the second layer are located at the edge of the frame, then the point of the point cloud that corresponds to the query pixel is identified as a boundary point. If (i) all of the pixels in the second layer are valid, (ii) all of the pixels in the second layer belong to a patch that is different than the query pixel, or (iii) none of the pixels in the second layer are located at the edge of the frame, then the encoder 510 selects a new query pixel.

The decoder 550 can then perform a smoothing to the identified boundary points to increase the visual quality of the reconstructed point cloud by removing any possible artifacts. Thereafter, the decoder 550 can render the point cloud to be viewed by a user.

Although FIG. 9 illustrates one example of a method 900 for decoding a point cloud, various changes may be made to FIG. 9. For example, while shown as a series of steps, various steps in FIG. 9 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
a communication interface configured to receive a bitstream; and
a processor operably coupled to the communication interface, wherein the processor is configured to:
decode from the bitstream a first frame that includes pixels, wherein a portion of the pixels of the first frame represent geometric locations of points of a three-dimensional (3D) point cloud that are organized into patches corresponding to respective clusters of the points of the 3D point cloud,
decode from the bitstream a second frame that includes pixels, wherein a portion of the pixels of the second frame represent attribute information of the points of the 3D point cloud, and positions of the pixels in the second frame correspond to respective positions of the pixels in the first frame,
decode from the bitstream an occupancy map frame that includes pixels that identify the portion of the pixels in the first frame that represent the geometric locations of the points of the 3D point cloud,
reconstruct the 3D point cloud using the first frame, the second frame, and the occupancy map frame, and
perform a single pass of the occupancy map frame to identify, based on a value of the pixels within the occupancy map frame, points of the reconstructed 3D point cloud that correspond to a subset of pixels in the first frame and the second frame that are positioned within a proximity threshold to a boundary of any of the patches,
wherein to identify the points of the reconstructed 3D point cloud that correspond to the subset of pixels, the processor is configured to:
select a query pixel of the occupancy map frame,
determine, based on a value of the query pixel, whether the query pixel is valid or invalid, and
in response to determining that the query pixel is valid, identify the query pixel as a first query pixel, a valid pixel indicating that a pixel in the first frame that is positioned at the same location as the valid pixel in the occupancy map frame, represents a geometric location of a point of the 3D point cloud.

2. The decoding device of claim 1, wherein the processor is further configured to:
identify, from the bitstream, geometry smoothing parameters or attribute smoothing parameters;
incrementally select the pixels of the occupancy map frame until all of the points of the 3D point cloud are identified as boundary points or non-boundary points, wherein the boundary points correspond to the subset of pixels in the first frame and in the second frame; and
perform smoothing to the identified boundary points based on the geometry smoothing parameters or the attribute smoothing parameters.

3. The decoding device of claim 1, wherein in response to determining that the query pixel is invalid, the processor is configured to:
continue to inspect values of the pixels in the occupancy map frame until the first query pixel is identified, an invalid pixel indicating that a pixel in the first frame that is positioned at the same location as the invalid pixel in the occupancy map frame, does not represents a geometric location of a point of the 3D point cloud.

4. The decoding device of claim 1, wherein in response to identifying the first query pixel, the processor is configured to:
identify a first layer of pixels in the occupancy map frame that are adjacent to the first query pixel;
determine, based on values of the pixels in the first layer, whether any of the pixels in the first layer are invalid; and
in response to determining that at least one of the pixels in the first layer is invalid, identify a point of the reconstructed 3D point cloud, that is represented by a pixel in the first frame at the same location as the first query pixel in the occupancy map frame, as a boundary point.

5. The decoding device of claim 4, wherein in response to determining that all of the pixels in the first layer are valid, the processor is configured to:
identify a second layer of pixels in the occupancy map frame that are adjacent to the first layer of pixels;
determine, based on values of the pixels in the second layer, whether any of the pixels in the second layer are invalid;
in response to determining that at least one of the pixels in the second layer is invalid, identify a point of the reconstructed 3D point cloud, that is represented by a pixel in the first frame at the same location as the first query pixel in the occupancy map frame, as a boundary point; and
in response to either determining that all of the pixels in the second layer are valid or identifying the point of the reconstructed 3D point cloud as the boundary point, continue to identify subsequent query pixels of the occupancy map frame that correspond to boundary points of the reconstructed 3D point cloud.

6. The decoding device of claim 1, wherein in response to identifying the first query pixel, the processor is further configured to:
identify a first patch that a geometry pixel in the first frame belongs to, wherein the geometry pixel is positioned at the same location as the first query pixel in the occupancy map frame;
identify a first layer of pixels in the first frame that are adjacent to the geometry pixel;
determine whether (i) any of the pixels in the first layer belong to a second patch and (ii) whether any of the pixels in the first layer are invalid, wherein the first patch and the second patch correspond to different clusters of points of the 3D point cloud;
in response to determining that at least one of the pixels in the first layer belongs to the second patch or at least one of the pixels in the first layer are invalid, identify a point of the reconstructed 3D point cloud, which is represented by the geometry pixel, as a boundary point;
in response to determining that all of the pixels in the first layer belongs to the first patch and all of the pixels in the first layer are valid, identify a second layer of pixels in the first frame that are adjacent to the first layer of pixels;

determine (i) whether any of the pixels in the second layer belong to the second patch and (ii) whether any of the pixels in the second layer are invalid; and in response to determining that at least one of the pixels in the second layer belongs to the second patch or at least one of the pixels in the second layer are invalid, identify the point of the reconstructed 3D point cloud, which is represented by the geometry pixel, as a boundary point.

7. The decoding device of claim 1, wherein in response to identifying the first query pixel, the processor is further configured to:

determine whether the first query pixel is located within the proximity threshold to an edge of the occupancy map frame, and in response to determining that the first query pixel is located within the proximity threshold to the edge of the occupancy map frame, identify a point of the reconstructed 3D point cloud that corresponds the first query pixel as a boundary point.

8. A method for point cloud decoding, the method comprising:

receiving a bitstream;

decoding from the bitstream a first frame that includes pixels, wherein a portion of the pixels of the first frame represent geometric locations of points of a three-dimensional (3D) point cloud that are organized into patches corresponding to respective clusters of the points of the 3D point cloud;

decoding from the bitstream a second frame that includes pixels, wherein a portion of the pixels of the second frame represent attribute information of the points of the 3D point cloud, and positions of the pixels in the second frame correspond to respective positions of the pixels in the first frame;

decoding from the bitstream an occupancy map frame that includes pixels that identify the portion of the pixels in the first frame that represent the geometric locations of the points of the 3D point cloud;

reconstructing the 3D point cloud using the first frame, the second frame, and the occupancy map frame; and performing a single pass of the occupancy map frame to identify, based on a value of the pixels within the occupancy map frame, points of the reconstructed 3D point cloud that correspond to a subset of pixels in the first frame and the second frame that are positioned within a proximity threshold to a boundary of any of the patches, wherein identifying the points of the reconstructed 3D point cloud that correspond to the subset of pixels comprises:

selecting a query pixel of the occupancy map frame;

determining, based on a value of the query pixel, whether the query pixel is valid or invalid; and in response to determining that the query pixel is valid, identify the query pixel as a first query pixel, a valid pixel indicating that a pixel in the first frame that is positioned at the same location as the valid pixel in the occupancy map frame, represents a geometric location of a point of the 3D point cloud.

9. The method of claim 8, further comprising:

in response to determining that the query pixel is invalid, continue to inspect values of the pixels in the occupancy map frame until the first query pixel is identified, an invalid pixel indicating that a pixel in the first frame that is positioned at the same location as the invalid pixel in the occupancy map frame, does not represents a geometric location of a point of the 3D point cloud.

10. The method of claim 8, further comprising:

in response to identifying the first query pixel, identifying a first layer of pixels in the occupancy map frame that are adjacent to the first query pixel;

determining, based on values of the pixels in the first layer, whether any of the pixels in the first layer are invalid; and in response to determining that at least one of the pixels in the first layer is invalid, identifying a point of the reconstructed 3D point cloud, that is represented by a pixel in the first frame at the same location as the first query pixel in the occupancy map frame, as a boundary point.

11. The method of claim 10, further comprising:

in response to determining that all of the pixels in the first layer are valid, identifying a second layer of pixels in the occupancy map frame that are adjacent to the first layer of pixels;

determining, based on values of the pixels in the second layer, whether any of the pixels in the second layer are invalid;

in response to determining that at least one of the pixels in the second layer is invalid, identifying a point of the reconstructed 3D point cloud, that is represented by a pixel in the first frame at the same location as the first query pixel in the occupancy map frame, as a boundary point; and in response to either determining that all of the pixels in the second layer are valid, or identifying the point of the reconstructed 3D point cloud as the boundary point, continue identifying subsequent query pixels of the occupancy map frame that correspond to boundary points of the reconstructed 3D point cloud.

12. The method of claim 8, further comprising:

in response to identifying the first query pixel, identifying a first patch that a geometry pixel in the first frame belongs to, wherein the geometry pixel is positioned at the same location as the first query pixel in the occupancy map frame;

identifying a first layer of pixels in the first frame that are adjacent to the geometry pixel;

determining whether (i) any of the pixels in the first layer belong to a second patch and (ii) whether any of the pixels in the first layer are invalid, wherein the first patch and the second patch correspond to different clusters of points of the 3D point cloud;

in response to determining that at least one of the pixels in the first layer belongs to the second patch or at least one of the pixels in the first layer are invalid, identifying a point of the reconstructed 3D point cloud, which is represented by the geometry pixel, as a boundary point;

in response to determining that all of the pixels in the first layer belongs to the first patch and all of the pixels in the first layer are valid, identifying a second layer of pixels in the first frame that are adjacent to the first layer of pixels;

determining (i) whether any of the pixels in the second layer belong to the second patch and (ii) whether any of the pixels in the second layer are invalid; and in response to determining that at least one of the pixels in the second layer belongs to the second patch or at least one of the pixels in the second layer are invalid, identifying the point of the reconstructed 3D point cloud, which is represented by the geometry pixel, as a boundary point.

13. The method of claim 8, further comprising:
in response to identifying the first query pixel, determining whether the first query pixel is located within the proximity threshold to an edge of the occupancy map frame, and
in response to determining that the first query pixel is located within the proximity threshold to the edge of the occupancy map frame, identifying a point of the reconstructed 3D point cloud that corresponds the first query pixel as a boundary point.

14. An encoding device for point cloud encoding, the encoding device comprising:
a processor configured to:
generate, for a three-dimensional (3D) point cloud, a first frame that includes pixels, wherein a portion of the pixels of the first frame represent geometric locations of points of the 3D point cloud that are organized into patches corresponding to respective clusters of the points of the 3D point cloud,
generate a second frame that includes pixels, wherein a portion of the pixels of the second frame represent attribute information of points of the 3D point cloud, and positions of the pixels in the second frame correspond to respective positions of the pixels in the first frame,
generate an occupancy map frame that includes pixels that identify the portion of the pixels in the first frame that represent the geometric locations of the points of the 3D point cloud,
encode the first frame to generate a geometry sub-stream, the second frame to generate an attribute sub-stream, and the occupancy map frame to generate an occupancy map sub-stream;
in response to decoding the geometry sub-stream, the attribute sub-stream and the occupancy map sub-stream, reconstruct the 3D point cloud using the first frame, the second frame and the occupancy map frame,
perform a single pass of the occupancy map frame to identify, based on a value of the pixels within the occupancy map frame, points of the reconstructed 3D point cloud that correspond to a subset of pixels in the first frame and in the second frame that are positioned within a proximity threshold to a boundary of any of the patches, and
combine the geometry sub-stream, the attribute sub-stream and the occupancy map sub-stream to generate a bitstream; and
a communication interface operably coupled to the processor, the communication interface configured to transmit the bitstream,
wherein to identify the points of the reconstructed 3D point cloud that correspond to the subset of pixels, the processor is configured to:
select a query pixel of the occupancy map frame;
determine, based on a value of the query pixel, whether the query pixel is valid or invalid; and
in response to determining that the query pixel is valid, identify the query pixel as a first query pixel, a valid pixel indicating that a pixel in the first frame that is positioned at the same location as the valid pixel in the occupancy map frame, represents a geometric location of a point of the 3D point cloud.

15. The encoding device of claim 14, wherein the processor is further configured to:
incrementally select the pixels of the occupancy map frame until all of the points of the 3D point cloud are identified as boundary points or non-boundary points, wherein the boundary points correspond to the subset of pixels in the first frame and in the second frame;
perform geometry smoothing to the identified boundary points to generate geometry smoothing parameters or attribute smoothing to the identified boundary points to generate attribute smoothing parameters; and
when geometry smoothing is performed include the geometry smoothing parameters in the bitstream and when attribute smoothing is performed include the attribute smoothing parameters in the bitstream.

16. The encoding device of claim 14, wherein in response to determining that the query pixel is invalid, the processor is configured to:
continue to inspect values of the pixels in the occupancy map frame until the first query pixel is identified, an invalid pixel indicating that a pixel in the first frame that is positioned at the same location as the invalid pixel in the occupancy map frame, does not represents a geometric location of a point of the 3D point cloud.

17. The encoding device of claim 14, wherein in response to identifying the first query pixel, the processor is configured to:
identify a first layer of pixels in the occupancy map frame that are adjacent to the first query pixel;
determine, based on values of the pixels in the first layer, whether any of the pixels in the first layer are invalid; and
in response to determining that at least one of the pixels in the first layer is invalid, identify a point of the reconstructed 3D point cloud, that is represented by a pixel in the first frame at the same location as the first query pixel in the occupancy map frame, as a boundary point.

18. The encoding device of claim 17, wherein in response to determining that all of the pixels in the first layer are valid, the processor is configured to:
identify a second layer of pixels in the occupancy map frame that are adjacent to the first layer of pixels;
determine, based on values of the pixels in the second layer, whether any of the pixels in the second layer are invalid;
in response to determining that at least one of the pixels in the second layer is invalid, identify a point of the reconstructed 3D point cloud, that is represented by a pixel in the first frame at the same location as the first query pixel in the occupancy map frame, as a boundary point; and
in response to either determining that all of the pixels in the second layer are valid, or identifying the point of the reconstructed 3D point cloud as the boundary point, continue to identify subsequent query pixels of the occupancy map frame that correspond to boundary points of the reconstructed 3D point cloud.

19. The encoding device of claim 14, wherein in response to identifying the first query pixel, the processor is further configured to:
identify a first patch that a geometry pixel in the first frame belongs to, wherein the geometry pixel is positioned at the same location as the first query pixel in the occupancy map frame;
identify a first layer of pixels in the first frame that are adjacent to the geometry pixel;

determine whether (i) any of the pixels in the first layer belong to a second patch and (ii) whether any of the pixels in the first layer are invalid, wherein the first patch and the second patch correspond to different clusters of points of the 3D point cloud;

in response to determining that at least one of the pixels in the first layer belongs to the second patch or at least one of the pixels in the first layer are invalid, identify a point of the reconstructed 3D point cloud, which is represented by the geometry pixel, as a boundary point;

in response to determining that all of the pixels in the first layer belongs to the first patch and all of the pixels in the first layer are valid, identify a second layer of pixels in the first frame that are adjacent to the first layer of pixels;

determine (i) whether any of the pixels in the second layer belong to the second patch and (ii) whether any of the pixels in the second layer are invalid; and in response to determining that at least one of the pixels in the second layer belongs to the second patch or at least one of the pixels in the second layer are invalid, identify the point of the reconstructed 3D point cloud, which is represented by the geometry pixel, as a boundary point.

20. The encoding device of claim 14, wherein in response to identifying the first query pixel, the processor is further configured to:

determine whether the first query pixel is located within the proximity threshold to an edge of the occupancy map frame, and in response to determining that the first query pixel is located within the proximity threshold to the edge of the occupancy map frame, identify a point of the reconstructed 3D point cloud that corresponds the first query pixel as a boundary point.

* * * * *